(12) United States Patent
Thakkar et al.

(10) Patent No.: US 9,830,084 B2
(45) Date of Patent: Nov. 28, 2017

(54) WRITING LOGICAL GROUPS OF DATA TO PHYSICAL LOCATIONS IN MEMORY USING HEADERS

(71) Applicant: SanDisk Technologies LLC, Plano, TX (US)

(72) Inventors: Umang Thakkar, Cupertino, CA (US); Gary Lin, San Jose, CA (US); Robert Gugel, Longmont, CO (US)

(73) Assignee: SanDisk Technologies LLC, Plano, TX (US)

( * ) Notice: Subject to any disclaimer, the term of this patent is extended or adjusted under 35 U.S.C. 154(b) by 0 days.

(21) Appl. No.: 15/176,070

(22) Filed: Jun. 7, 2016

(65) Prior Publication Data

US 2017/0160931 A1    Jun. 8, 2017

Related U.S. Application Data

(60) Provisional application No. 62/262,748, filed on Dec. 3, 2015.

(51) Int. Cl.
  *G06F 12/10* (2016.01)
  *G06F 3/06* (2006.01)
  *G06F 12/02* (2006.01)

(52) U.S. Cl.
  CPC ........... *G06F 3/061* (2013.01); *G06F 3/0655* (2013.01); *G06F 3/0688* (2013.01); *G06F 12/0238* (2013.01); *G06F 12/10* (2013.01)

(58) Field of Classification Search
  CPC ...... G06F 3/0655; G06F 3/0688; G06F 12/10; G06F 12/0238

(Continued)

(56) References Cited

U.S. PATENT DOCUMENTS 6,018,304 A    1/2000  Bessios
6,070,074 A    5/2000  Perahia et al.
(Continued)

FOREIGN PATENT DOCUMENTS

EP       2447842 A1       5/2012
WO    WO 2007/036834     4/2007
(Continued)

OTHER PUBLICATIONS

International Search Report and Written Opinion dated May 23, 2013, received in International Patent Application No. PCT/US2012/065914, which corresponds to U.S. Appl. No. 13/679,963, 7 pgs (Frayer).

(Continued)

*Primary Examiner* — Than Nguyen
(74) *Attorney, Agent, or Firm* — Brinks Gilson & Lione

(57) ABSTRACT

The various implementations described herein include systems, methods and/or devices for storing data in a storage device. In one aspect, commands are executed, each command for storing in a storage device a logical group of data comprising one or more logical portions and having a logical address. For each command, in accordance with a determination that a remaining capacity of a first physical memory portion is less than a threshold capacity, data is stored for a head logical portion in a first physical location corresponding to the first physical memory portion. Furthermore, data is stored for a tail logical portion in a second physical location corresponding to a second physical memory portion. Mapping entries are stored in a mapping table, where the mapping entries map the corresponding logical address to at least the first physical location in the storage device.

19 Claims, 14 Drawing Sheets

(58) Field of Classification Search
USPC .................................................. 711/103, 202
See application file for complete search history.

(56) References Cited

U.S. PATENT DOCUMENTS

| | | | |
|---|---|---|---|
| 6,138,261 | A | 10/2000 | Wilcoxson et al. |
| 6,182,264 | B1 | 1/2001 | Ott |
| 6,192,092 | B1 | 2/2001 | Dizon et al. |
| 6,516,437 | B1 | 2/2003 | Van Stralen et al. |
| 7,559,004 | B1 | 7/2009 | Chang et al. |
| 7,685,494 | B1 | 3/2010 | Varnica et al. |
| 7,954,041 | B2 | 5/2011 | Hong et al. |
| 7,974,368 | B2 | 7/2011 | Shieh et al. |
| 8,006,161 | B2 | 8/2011 | Lestable et al. |
| 8,069,390 | B2 | 11/2011 | Lin |
| 8,190,967 | B2 | 5/2012 | Hong et al. |
| 2004/0146006 | A1 | 7/2004 | Jackson |
| 2005/0094459 | A1 | 5/2005 | Sesek et al. |
| 2005/0144367 | A1* | 6/2005 | Sinclair ............... G06F 12/0246 711/103 |
| 2005/0172207 | A1 | 8/2005 | Radke et al. |
| 2007/0101095 | A1* | 5/2007 | Gorobets ............ G06F 12/0246 711/203 |
| 2007/0101096 | A1* | 5/2007 | Gorobets ............ G06F 12/0246 711/203 |
| 2007/0157064 | A1 | 7/2007 | Falik et al. |
| 2008/0086677 | A1 | 4/2008 | Yang et al. |
| 2008/0168319 | A1 | 7/2008 | Lee et al. |
| 2008/0195900 | A1 | 8/2008 | Chang et al. |
| 2009/0144598 | A1 | 6/2009 | Yoon et al. |
| 2009/0222708 | A1 | 9/2009 | Yamaga |
| 2010/0161887 | A1* | 6/2010 | Nakazumi ........... G06F 12/0246 711/103 |
| 2011/0202818 | A1 | 8/2011 | Yoon et al. |
| 2012/0079229 | A1 | 3/2012 | Jensen et al. |
| 2012/0192035 | A1 | 7/2012 | Nakanishi |
| 2012/0290899 | A1 | 11/2012 | Cideciyan et al. |
| 2012/0317463 | A1 | 12/2012 | Sugahara et al. |
| 2013/0346671 | A1 | 12/2013 | Michael et al. |
| 2014/0136927 | A1 | 5/2014 | Li et al. |
| 2014/0229799 | A1 | 8/2014 | Hubris et al. |
| 2015/0186270 | A1* | 7/2015 | Peng ...................... G11C 16/16 711/3 |

FOREIGN PATENT DOCUMENTS

| | | |
|---|---|---|
| WO | WO 2009/028281 | 3/2009 |
| WO | WO 2009/032945 | 3/2009 |

OTHER PUBLICATIONS

Office Action dated Nov. 4, 2015 received in European Patent Application No. 12808940.6, which corresponds to U.S. Appl. No. 13/679,963, 4 pages. (Frayer).

International Search Report and Written Opinion dated Apr. 5, 2013, received in International Patent Application No. PCT/US2012/065916, which corresponds to U.S. Appl. No. 13/679,969, 7 pgs (Frayer).

Office Action dated Nov. 3, 2015 received in European Patent Application No. 12806217.1, which corresponds to U.S. Appl. No. 13/679,969, 4 pages. (Frayer).

Office Action dated Nov. 2, 2015 received in European Patent Application No. 12805828.6, which corresponds to U.S. Appl. No. 13/679,970, 5 pages. (Frayer).

International Search Report and Written Opinion dated Jun. 17, 2013, received in International Patent Application No. PCT/US2012/065919, which corresponds to U.S. Appl. No. 13/679,970, 8 pgs (Frayer).

International Search Report and Written Opinion dated Sep. 30, 2016, received in International Patent Application No. PCT/US2016/026052, which corresponds to U.S. Appl. No. 14/929,148, 18 pages. (Olbrich).

* cited by examiner

604 — Execute a plurality of commands, each command of the plurality of commands for storing in a storage device a logical group of data comprising one or more logical portions, the logical group of data having a logical address. The storage device includes a plurality of physical memory portions having a predefined sequence of physical locations in one or more non-volatile memory (NVM) devices of the storage device. For each command of the plurality of commands:

610 — In accordance with a determination that a remaining capacity of a first physical memory portion of the plurality of physical memory portions is less than a threshold capacity:

(6A)

614 — Store data for the tail logical portion of the one or more logical portions in a second physical location in the storage device, the second physical location corresponding to a second physical memory portion of the plurality of physical memory portions 616 — The first and second physical memory portions are distinct 618 — The second physical location at which the data for the tail logical portion is stored corresponds to a determined offset from the beginning of the second physical memory portion 620 — The determined offset is determined based on a size of the data for the tail logical portion 622 — The size of the data for the tail logical portion is determined based on a total size of data for a maximum number of complete logical groups of data that can be stored within the first physical memory portion (6B)

Figure 6B

WRITING LOGICAL GROUPS OF DATA TO PHYSICAL LOCATIONS IN MEMORY USING HEADERS

RELATED APPLICATIONS

This application claims priority to U.S. Provisional Patent Application No. 62/262,748, filed Dec. 3, 2015, which is hereby incorporated by reference in its entirety.

This application is related to U.S. patent application Ser. No. 14/929,148, "Device-Specific Variable Error Correction," filed on Oct. 30, 2015; U.S. patent application Ser. No. 14/885,883, "Method for Modifying Device-Specific Variable Error Correction Settings," filed on Oct. 16, 2015; U.S. patent application Ser. No. 14/883,547, "Mapping Logical Groups of Data to Physical Locations in Memory," filed on Oct. 14, 2015; U.S. Provisional Patent Application No. 62/144,839, "Device-Specific Variable Error Correction," filed Apr. 8, 2015; U.S. Provisional Patent Application No. 62/144,844, "Method for Modifying Device-Specific Variable Error Correction Settings," filed on Apr. 8, 2015; and U.S. Provisional Patent Application No. 62/144,847, "Mapping Logical Groups of Data to Physical Locations in Memory," filed on Apr. 8, 2015; all of which are hereby incorporated by reference in their entireties.

TECHNICAL FIELD

The disclosed embodiments relate generally to memory systems, and in particular, to reading data from and storing data in a storage device using headers.

BACKGROUND

Non-volatile memories, such as flash memory devices, have supported the increased portability of consumer electronics, and have been utilized in relatively low power enterprise storage systems suitable for cloud computing and mass storage. The ever-present demand for almost continual advancement in these areas is often accompanied by demand to improve data storage capacity. The demand for greater storage capacity in turn stokes demand for greater storage density, so that specifications such as power consumption and form factor may be maintained and preferably reduced. As such, there is ongoing pressure to increase the storage density of non-volatile memories in order to further improve the useful attributes of such devices. However, a drawback of increasing storage density is that the stored data is increasingly prone to storage and/or reading errors.

Error correction schemes have been used to limit the increased likelihood of errors in memory systems. However, error correction schemes, particularly those with high error correction capability, are often resource intensive and not configured for optimal system performance. In turn, the implementation of improved error correction schemes demands that read and write operations adapt accordingly in order to achieve efficient system performance.

SUMMARY

Various implementations of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various implementations are used to enable: (i) reading data stored in a non-volatile storage device having a plurality of physical memory portions having a predefined sequence of physical locations in one or more non-volatile memory devices, and (ii) storing data in a non-volatile storage device having a plurality of physical memory portions having a predefined sequence of physical locations in one or more non-volatile memory devices.

In one aspect, a plurality of read commands is executed, each command for reading, from a specified logical address, a requested logical group of data comprising one or more logical portions. For each read command, a first physical location in the storage device corresponding to the logical address specified by the read command is identified from a mapping table, and data is read from the first physical location. In accordance with a determination that the first physical location in the storage device stores less than all of the logical group of data requested by the read command (e.g., part of the logical group of data is stored elsewhere, but the first physical location had insufficient capacity store the entire logical group of data), a second physical location in the storage device is identified based on information contained within the data read from the first physical location, and data is read from the second physical location. Furthermore, at least respective portions of the data read from the first physical location and/or the second physical location in the storage device are decoded to produce the requested logical group of data. For each read command in the plurality of read commands, the requested logical group of data is then returned.

In another aspect, a plurality of commands is executed, each command for storing in a storage device a logical group of data comprising one or more logical portions and having a logical address. For each command, in accordance with a determination that a remaining capacity of a first physical memory portion is less than a threshold capacity, data is stored for a head logical portion in a first physical location corresponding to the first physical memory portion. Furthermore, data is stored for a tail logical portion in a second physical location corresponding to a second physical memory portion. Mapping entries are stored in a mapping table, where the mapping entries map the corresponding logical address to at least the first physical location in the storage device.

BRIEF DESCRIPTION OF THE DRAWINGS

So that the present disclosure can be understood in greater detail, a more particular description may be had by reference to the features of various implementations, some of which are illustrated in the appended drawings. The appended drawings, however, merely illustrate the more pertinent features of the present disclosure and are therefore not to be considered limiting, for the description may admit to other effective features.

FIGS. 6A-6D illustrates a flowchart representation of a method for storing data in a non-volatile memory device, in accordance with some embodiments.

Figure 1:
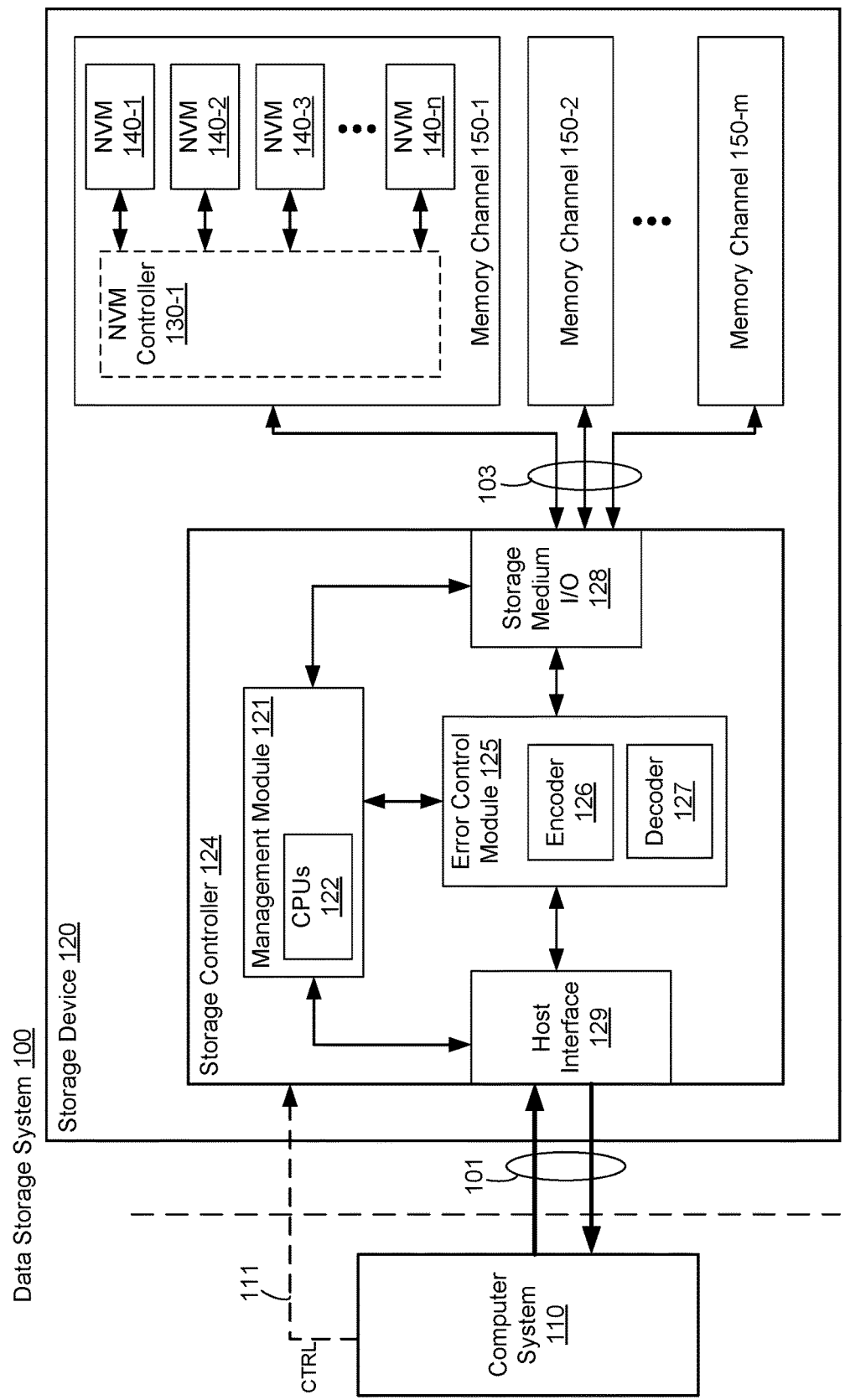
FIG. 1 is a block diagram illustrating an implementation of a data storage system, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The various implementations described herein include systems, methods and/or devices used to enable: (i) reading data stored in a non-volatile storage device having a plurality of physical memory portions having a predefined sequence of physical locations in one or more non-volatile memory devices, and (ii) storing data in a non-volatile storage device having a plurality of physical memory portions having a predefined sequence of physical locations in one or more non-volatile memory devices.

(A1) More specifically, some implementations include a method of reading data stored in a non-volatile storage device having a plurality of physical memory portions having a predefined sequence of physical locations in one or more non-volatile memory (NVM) devices of the storage device. In some implementations, the method includes executing a plurality of read commands, each read command of the plurality of read commands for reading a requested logical group of data from a specified logical address, the requested logical group of data comprising one or more logical portions. For each read command of the plurality of read commands, a first physical location in the storage device corresponding to the logical address specified by the read command is identified from a mapping table, and data is read from the first physical location. In accordance with a determination that the first physical location in the storage device stores less than all of the logical group of data requested by the read command, a second physical location in the storage device is identified based on information contained within the data read from the first physical location, and data is read from the second physical location. At least respective portions of the data read from the first physical location and/or the second physical location in the storage device are decoded to produce the requested logical group of data, and the requested logical group of data is returned.

(A2) In some embodiments of the method of A1, the first physical location corresponds to data for a head logical portion of the one or more logical portions of the requested logical group of data, and corresponds to a first physical memory portion of the plurality of physical memory portions. Furthermore, the second physical location corresponds to data for a tail logical portion of the one or more logical portions of the requested logical group of data, and corresponds to a second physical memory portion of the plurality of physical memory portions, wherein the second physical memory portion is distinct from the first physical memory portion. Reading data from the first physical memory portion includes reading data from the first physical memory portion, and reading data from the second physical location includes reading data from the second physical memory portion.

(A3) In some embodiments of the method of A2, the first physical memory portion is a first physical page of the storage device, and the second physical memory portion is a second physical page of the storage device.

(A4) In some embodiments of the method of any of A2-A3, the first physical memory portion is a physical memory portion of a first die, and the second physical memory portion is a physical memory portion of a second die, distinct from the first die.

(A5) In some embodiments of the method of any of A2-A3, the first physical memory portion and the second physical memory portion are physical memory portions of the same die.

(A6) In some embodiments of the method of any of A2-A5, each of the plurality of physical memory portions comprises a respective integer number of codewords arranged in a respective sequence. The first physical location corresponds to a subset of codewords, of respective codewords for the first physical memory portion, located at the end of the respective sequence, and the second physical location corresponds to a subset of codewords, of respective codewords for the second physical memory portion, located at the end of the respective sequence.

(A7) In some embodiments of the method of A6, the subset of codewords corresponding to the first physical location and the subset of codewords corresponding to the second physical location each comprise a single codeword.

(A8) In some embodiments of the method of any of A6-A7, the subset of codewords corresponding to the second physical location includes encoded data for a portion of the requested logical group of data and encoded data for a portion of a distinct logical group of data.

(A9) In some embodiments of the method of A8, the encoded data for the portion of the distinct logical group of data corresponds to a head logical portion for the distinct logical group of data.

(A10) In some embodiments of the method of any of A1-A9, the method includes determining whether the first physical location stores less than all of the requested logical group of data by reading a corresponding entry of the mapping table for the requested logical group of data, the corresponding entry indicating whether the first physical location stores less than all of the requested logical group of data.

(A11) In some embodiments of the method of A10, the corresponding entry includes a flag indicating whether the first physical location includes information specifying the second physical location.

(A12) In some embodiments of the method of any of A10-A11, the corresponding entry specifies the first and second physical locations corresponding to data for the one or more logical portions of the requested logical group of data, wherein the first and second physical locations correspond to distinct physical memory portions of the plurality of physical memory portions of the storage device.

(A13) In some embodiments of the method of any of A10-A12, the corresponding entry specifies a respective physical location at which the information specifying the second physical location is stored.

(A14) In some embodiments of the method of any of A1-A13, the method includes determining that the first physical location stores less than all of the requested logical group of data by decoding at least a portion of the data read from the first physical location, wherein the decoded data includes the information specifying the second physical location in the storage device.

(A15) In some embodiments of the method of any of A1-A14, the data read from the first physical location includes one or more codewords corresponding to encoded data for a portion of requested logical group of data, and further includes data corresponding to the information specifying the second physical location. The method further includes determining that the first physical location stores less than all of the requested logical group of data by reading the data corresponding to the information specifying the second physical location.

(A16) In some embodiments of the method of any of A1-A15, the method includes determining whether the first physical location stores less than all of the requested logical group of data by decoding at least a portion of the data read from the first physical location, and by comparing the size of the decoded data to the size of the requested logical group of data, wherein the first physical location stores less than all of the requested logical group of data if the size of the decoded data is less than the size of the requested logical group of data.

(A17) In some embodiments of the method of any of A1-A16, the first physical location corresponds to data for a head logical portion of the one or more logical portions, and the second physical location corresponds to data for a tail logical portion of the one or more logical portions. Furthermore, the information contained within the data read from the first physical location is stored in a header segment that specifies: the first physical location for the head logical portion and the second physical location for the tail logical portion; a check value for the logical group of data for verifying the first and/or second physical location for the tail logical portion; and/or additional parity bits for error correcting decoded data for the logical group of data.

(A18) In some embodiments of the method of any of A1-A17, the data read from the first physical location and the data read from the second physical location comprise respective sets of one or more codewords. Furthermore, the decoding includes determining, for each of the respective sets of one or more codewords, a respective error correction format based on the respective physical location to which the respective set of one or more codewords corresponds; and decoding each of the respective sets of codewords using the determined respective error correction format to produce the requested logical group of data.

(A19) In another aspect, any of the methods A1-A18 described above are performed by a data storage device or system comprising one or more NVM devices, wherein a plurality of physical memory portions of the storage device has a predefined sequence of physical locations in the one or more NVM devices. The storage device or system further includes a memory controller that includes a management module, and also includes an interface to receive a plurality of read commands, each read command of the plurality of read commands for reading a requested logical group of data from a specified logical address, the requested logical group of data comprising one or more logical portions. Furthermore, the management module is configured to identify, from a mapping table, a first physical location in the storage device corresponding to the specified logical addresses. In accordance with a determination that the first physical location stores less than all of the logical group of data requested by the read command, the management module is also configured to identify a second physical location in the storage device based on information contained within data from the first physical location.

(A20) In yet another aspect, a non-transitory computer readable storage medium stores one or more programs for execution by one or more processors (e.g., in one or more storage controllers of a storage device or system), the one or more programs including instructions for performing the method of any of A1-A18.

(B1) Some implementations include a method of storing data in a non-volatile storage device having a plurality of physical memory portions having a predefined sequence of physical locations in one or more non-volatile memory (NVM) devices of the storage device. In some implementations, the method includes executing a plurality of commands, each command of the plurality of commands for storing in the storage device a logical group of data comprising one or more logical portions, the logical group of data having a logical address. For each command of the plurality of commands, in accordance with a determination that a remaining capacity of a first physical memory portion of the plurality of physical memory portions is less than a threshold capacity, data for a head logical portion of the one or more logical portions is stored in a first physical location in the storage device, the first physical location corresponding to the first physical memory portion. Furthermore, data for a tail logical portion of the one or more logical portions is stored in a second physical location in the storage device, the second physical location corresponding to a second physical memory portion of the plurality of physical memory portions. One or more mapping entries that map the corresponding logical address to at least the first physical location in the storage device are stored in a mapping table.

(B2) In some embodiments of the method of B1, the mapping table includes one or more mapping entries for the first and second physical locations that specify respective physical memory portions and respective offsets within the respective physical memory portions in which data for the head logical portion and the tail logical portion are stored.

(B3) In some embodiments of the method of any of B1-B2, the first and second physical memory portions are distinct physical pages of the storage device, or are distinct first and second physical memory portions in distinct first and second non-volatile memory die of the storage device.

(B4) In some embodiments of the method of any of B1-B3, in accordance with a determination that the remaining capacity of the first physical memory portion is greater than or equal to the threshold capacity, the method includes storing all of the data for the one or more logical portions in the first physical memory portion, wherein the one or more logical portions comprise a single logical portion for the entire logical group of data.

(B5) In some embodiments of the method of any of B1-B4, the second physical location at which the data for the tail logical portion is stored corresponds to a determined offset from the beginning of the second physical memory portion.

(B6) In some embodiments of the method of B5, the determined offset is determined based on a size of the data for the tail logical portion.

(B7) In some embodiments of the method of B6, the size of the data for the tail logical portion is determined based on a total size of data for a maximum number of complete logical groups of data that can be stored within the first physical memory portion.

(B8) In some embodiments of the method of B7, the total size of the data for the maximum number of complete logical groups of data is based on a corresponding error correction format for the first physical memory portion.

(B9) In some embodiments of the method of any of B1-B8, the method includes buffering data for the tail logical portion until a maximum number of complete logical groups is stored in the second physical memory portion.

(B10) In some embodiments of the method of any of B1-B9, a size of a subsequent head logical portion of a subsequent logical group of data is based on a remaining data capacity of the second physical memory portion, the remaining data capacity determined based on a total size of data for a maximum number of complete logical groups that can be stored within the second physical memory portion and a size of the data for the tail logical portion.

(B11) In some embodiments of the method of any of B1-B10, the method includes storing, separate from the mapping table, information specifying the second physical location corresponding to the data for the tail logical portion.

(B12) In some embodiments of the method of B11, the information specifying the second physical location is stored in a header segment that specifies: the first physical location for the head logical portion and the second physical location for the tail logical portion; a check value for the logical group of data for verifying the first and/or second physical location for the tail logical portion; and/or additional parity bits for error correcting decoded data for the logical group of data.

(B13) In some embodiments of the method of any of B11-B12, the information specifying the second physical location is stored at an adjacent physical location in the first physical memory portion next to the first physical location at which data for the head logical portion is stored.

(B14) In some embodiments of the method of B13, the adjacent physical location is also next to a different physical location at which data for a previous tail logical portion is stored, the previous tail logical portion corresponding to a logical portion for a different logical group of data.

(B15) In some embodiments of the method of any of B11-B14, storing the information specifying the second physical location includes encoding at least the information specifying the second physical location together with the data for the head logical portion into a set of one or more codewords.

(B16) In some embodiments of the method of any of B11-B15, the information specifying the second physical location is associated with the head logical portion and the corresponding tail logical portion.

(B17) In some embodiments of the method of any of B11-B16, the method includes storing, in the mapping table, an indication of a physical location at which the information specifying the second physical location is stored.

(B18) In some embodiments of the method of any of B1-B17, storing the data for the one or more logical portions in one or more physical locations in the storage device includes encoding each respective logical portion of the one or more logical portions using a respective error correction format for the physical memory portion in which data for the respective logic portion is being stored.

(B19) In some embodiments of the method of B18, the error correction format indicates at least one of a corresponding code rate, a codeword structure, and an error correction type for a respective physical memory portion of the one or more physical memory portions.

(B20) In another aspect, any of the methods B1-B19 described above are performed by a data storage device or system comprising one or more NVM devices, wherein a plurality of physical memory portions of the storage device has a predefined sequence of physical locations in the one or more NVM devices. The storage device or system further includes a memory controller that includes a management module, and also includes an interface to receive a plurality of commands, each command of the plurality of commands for storing in the storage device a logical group of data comprising one or more logical portions, the logical group of data having a logical address. The management module is configured to determine whether a remaining capacity of a first physical memory portion of the plurality of physical memory portions is less than a threshold capacity. In accordance with a determination that the remaining capacity is less than the threshold capacity, the management module is configured to store data for a head logical portion of the one or more logical portions in a first physical location in the storage device, the first physical location corresponding to the first physical memory portion, and store data for a tail logical portion of the one or more logical portions in a second physical location in the storage device, the second physical location corresponding to a second physical memory portion of the plurality of physical memory portions. Furthermore, the management module is configured to store, in a mapping table, one or more mapping entries that map the corresponding logical address to at least the first physical location in the storage device.

(B21) In yet another aspect, a non-transitory computer readable storage medium stores one or more programs for execution by one or more processors (e.g., in one or more storage controllers of a storage device or system), the one or more programs including instructions for performing the method of any of B1-B19.

(C1) Some embodiments include an electronic system or device (e.g., data storage device 120, data storage system 100, or storage controller 124, FIG. 1), comprising: one or more processors; and memory storing one or more programs to be executed by the one or more processors, the one or more programs comprising instructions for performing or controlling performance of any of the methods described herein. Some embodiments include a non-transitory computer readable storage medium, storing one or more programs for execution by one or more processors of an electronic system or device (e.g., data storage device 120, FIG. 1 or storage controller 124, FIG. 1), the one or more programs including instructions for performing or controlling performance of any of the methods described herein. Some embodiments include an electronic system or device (e.g., data storage device 120, FIG. 1 or storage controller 124, FIG. 1) comprising means for performing or controlling performance of the operations of any of the methods described herein.

Numerous details are described herein in order to provide a thorough understanding of the example implementations illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure more pertinent aspects of the implementations described herein.

FIG. 1 is a block diagram illustrating an implementation of a data storage system 100, in accordance with some embodiments. While some example features are illustrated, various other features have not been illustrated for the sake of brevity and so as not to obscure pertinent aspects of the example embodiments disclosed herein. To that end, as a non-limiting example, data storage system 100 includes a storage device 120, which includes a storage controller 124 and one or more memory channels 150 that each include one or more NVM devices 140 and optionally include a respective NVM controller 130, where data storage system 100 is used in conjunction with or includes a computer system 110. In some embodiments, NVM devices 140 for a single memory channel 150 comprise a single flash memory device while in other embodiments NVM devices 140 for a single memory channel 150 include a plurality of flash memory devices. In some embodiments, NVM devices 140 are NAND-type flash memory or NOR-type flash memory. In some embodiments, NVM devices 140 include one or more three-dimensional (3D) memory devices, as further defined herein. Further, in some embodiments, storage controller 124 is a solid-state drive (SSD) controller. However, other types of storage media may be included in accordance with aspects of a wide variety of embodiments (e.g., PCRAM, ReRAM, STT-RAM, etc.). In some embodiments, a flash memory device includes one or more flash memory die, one or more flash memory packages, one or more flash memory channels or the like. In some embodiments, data storage system 100 can contain one or more storage devices 120.

Computer system 110 is coupled to storage controller 124 through data connections 101, and optionally through a control line or bus 111 as well. However, in some embodiments computer system 110 includes storage controller 124, or a portion of storage controller 124, as a component and/or a subsystem. For example, in some embodiments, some or all of the functionality of storage controller 124 is implemented by software executed on computer system 110. Computer system 110 may be any suitable computer device, such as a computer, a laptop computer, a tablet device, a netbook, an internet kiosk, a personal digital assistant, a mobile phone, a smart phone, a gaming device, a computer server, or any other computing device. Computer system 110 is sometimes called a host, host system, client, or client system. In some embodiments, computer system 110 is a server system, such as a server system in a data center. In some embodiments, computer system 110 includes one or more processors, one or more types of memory, a display and/or other user interface components such as a keyboard, a touch screen display, a mouse, a track-pad, a digital camera and/or any number of supplemental devices to add functionality. In some embodiments, computer system 110 does not have a display and other user interface components.

In some implementations, storage device 120 includes NVM devices 140 such as flash memory devices (e.g., NVM devices 140-1 through 140-n). The NVM devices of storage device 120 are sometimes collectively called a storage medium. In some embodiments storage device 120 includes NVM controllers (e.g., NVM controllers 130, sometimes called memory channel controllers or port controllers) coupled between storage controller 124 and NVM devices 140. Viewed another way, in the aforementioned embodiments, storage device 120 includes m memory channels (e.g., memory channels 150-1 through 150-m), each of which has an NVM controller 130 and a set of NVM devices 140 coupled to the NVM controller for that memory channel, where m is an integer greater than one. However, in some embodiments, two or more memory channels share an NVM controller. Typically, each memory channel 150 has its own distinct set of one or more NVM devices 140. Alternatively, in some embodiments, storage device 120 does not include any NVM controllers 130, and instead storage controller 124 handles functions such as host command parsing and logical to physical address translation, and also manages the NVM devices 140 in all the memory channels 150-1 to 150-m, including distributing individual memory operations (e.g. read, write, and erase) commands to the NVM devices 140 in the various memory channels. In a non-limiting example, the number of memory channels in a typical storage device is 8, 16 or 32. In another non-limiting example, the number of NVM devices 140 per memory channel is typically 8, 16, 32 or 64. Furthermore, in some implementations, the number of NVM devices 140 is different in different memory channels.

Memory channels 150 are coupled to storage controller 124 through connections 103. Connections 103 are sometimes called data connections, but typically convey commands in addition to data, and optionally convey metadata, error correction information and/or other information in addition to data values to be stored in NVM devices 140 and data values read from NVM devices 140. In some embodiments, however, storage controller 124 and NVM devices 140 are included in the same device (i.e., an integral device) as components thereof. Furthermore, in some embodiments, storage controller 124 and NVM devices 140 are embedded in a host device (e.g., computer system 110), such as a mobile device, tablet, other computer or computer controlled device, and the methods described herein are performed, at least in part, by the embedded memory controller.

Flash memory device(s) (e.g., NVM devices 140) can be configured for enterprise storage suitable for applications such as cloud computing, for database applications, primary and/or secondary storage, or for caching data stored (or to be stored) in secondary storage, such as hard disk drives. Additionally and/or alternatively, flash memory device(s) can also be configured for relatively smaller-scale applications such as personal flash drives or hard-disk replacements for personal, laptop, and tablet computers.

NVM devices 140 are divided into a number of addressable and individually selectable blocks. In some embodiments, the individually selectable blocks are the minimum size erasable units in a flash memory device. In other words, each block contains the minimum number of memory cells that can be erased simultaneously. Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector, which is a subunit of a page. That is, a block includes a plurality of pages, each page contains a plurality of sectors, and each sector is the minimum unit of data for reading data from the flash memory device. The number of pages included in each block varies from one implementation to another; examples are 64, 128 and 256 pages, but other numbers of pages per block are suitable in some implementations.

As noted above, while data storage densities of non-volatile semiconductor memory devices are generally increasing, a drawback of increasing storage density is that the stored data is more prone to being stored and/or read erroneously. In some embodiments, error control coding can be utilized to limit the number of uncorrectable errors that are introduced by electrical fluctuations, defects in the storage medium, operating conditions, device history, write-read circuitry, etc., or a combination of these and various other factors.

In some embodiments, storage controller 124 includes a management module 121, a host interface 129, a storage medium I/O interface 128, and error control module 125. Storage controller 124 may include various additional features that have not been illustrated for the sake of brevity and so as not to obscure pertinent features of the example embodiments disclosed herein, and a different arrangement of features may be possible. Host interface 129 provides an interface to computer system 110 through data connections 101. Similarly, storage medium I/O 128 provides an interface to memory channels 150 and respective NVM devices 140 though connections 103. In some embodiments, storage medium interface I/O 128 includes transmit and receive circuitry, including circuitry capable of providing data, commands and configuration settings to NVM controllers 130 (e.g., reading threshold voltages for NAND-type flash memory).

In some embodiments, management module 121 includes one or more processing units (CPUs, also sometimes called processors) 122 configured to execute instructions in one or more programs (e.g., in management module 121). In some embodiments, the one or more CPUs 122 are shared by one or more components within, and in some cases, beyond the function of storage controller 124. Management module 121 is coupled to host interface 129, error control module 125 and storage medium I/O 128 in order to coordinate the operation of these components. In some embodiments, one or more modules of management module 121 are implemented in a management module of computer system 110 (not shown). In some embodiments, one or more processors of computer system 110 (not shown) are configured to execute instructions in one or more programs (e.g., in a management module of computer system 110).

Error control module 125 is coupled to storage medium I/O 128, host interface 129, and management module 121. As an example, error control module 125 is used to limit the number of uncorrectable errors inadvertently introduced into data during writes to memory or reads from memory. In some embodiments, error control module 125 is executed in software by the one or more CPUs 122 of management module 121, and, in other embodiments, error control module 125 is implemented in whole or in part using special purpose circuitry (e.g., to perform encoding and decoding functions). In some embodiments, error control module 125 is implemented in whole or in part by software executed on computer system 110.

In some embodiments, error control module 125 includes encoder 126 and decoder 127. In some embodiments, encoder 126 encodes data by applying an error control code to produce a codeword, which is subsequently stored in one or more NVM devices 140 of one or more memory channels 150. Codewords produced by the encoder include both data (sometimes herein called the encoded data) and corresponding error correction bits (sometimes called parity values, parity bits, or syndrome values). Furthermore, as described in greater detail below, encoders can be configured to produce codewords having a particular code rate (e.g., ratio of data bits in a codeword to the size of the codeword) and codeword structure (e.g., length, in bits, of the codeword; optionally, the codeword structure also includes information about where, within the codeword, the error correction bits are located). When the encoded data (e.g., one or more codewords) is read from NVM devices 140, the decoder applies a decoding process to the encoded data to recover the data, and to correct errors in the recovered data within the error correcting capability of the error control code.

Types of error correction codes include, for example, Hamming, Reed-Solomon (RS), Bose Chaudhuri Hocquenghem (BCH), and low-density parity-check (LDPC). Those skilled in the art will appreciate that various error control codes have different error detection and correction capacities, and that particular codes are selected for various applications for reasons beyond the scope of this disclosure. As such, an exhaustive review of the various types of error control codes is not provided herein. Moreover, those skilled in the art will appreciate that each type or family of error control codes may have encoding and decoding algorithms that are particular to the type, class, or family of error control codes. On the other hand, some algorithms may be utilized at least to some extent in the decoding of a number of different types or families of error control codes. As such, for the sake of brevity, an exhaustive description of the various types of encoding and decoding algorithms generally available and known to those skilled in the art is not provided herein.

In some embodiments, encoder 126 includes a plurality of encoders configured to encode data in accordance with one or more error correction formats (e.g., corresponding to a particular code rate, codeword structure, and error correction type, as described in greater detail below), and decoder 127 includes a plurality of decoders configured to decode data in accordance with one or more error correction formats. Furthermore, in some implementations, each of the plurality of encoders and/or decoders are configured to encode/decode data in accordance with distinct error correction formats (e.g., encoder 126 includes a BCH encoder and an LDPC encoder).

Error control module 125 optionally includes a soft information generation module (not shown) that is configured to provide soft information to one or more decoders of decoder 127. Typically, a soft information generation module converts the decoding result of a decoder into soft information. In some implementations, the soft information includes at least one of conditional probabilities (i.e., transition probabilities) associated with the codeword and log-likelihood ratios (LLRs) associated with the codeword.

As would be known to those skilled in the art, for many error control codes, the decoding process can often be improved by using soft information. Hard information decoding generally means that absolute decisions are made as to whether a data value (e.g., data-bit or code-bit) is one symbol or another in a particular symbol alphabet. For example, in a binary system, a particular data value can be either "0" or "1", even if the raw electrical analog value read from a storage location does not indicate that the electrical value representing the data value is sufficient to decide with certainty that the data value is "0" or "1." In other words, a hard-decision for a particular data value is based on the most likely symbol corresponding to the analog electrical value read from the non-volatile memory devices, and the probabilities that alternative decisions exist are ignored by the hard-decision process. Often the hard-decision is based on the Euclidian distances from the analog read value to electrical level(s) defining the symbols. By contrast, in the context of memory systems, the use of soft information is based on the probabilities that different outcomes exist in view of what is read from the storage medium.

In some embodiments, during a write operation, storage controller 124 (e.g., specifically, host interface 129) receives from computer system (host) 110 data to be stored in one or more NVM devices 140, in addition to one or more host write commands for storing the data. In accordance with the one or more host write commands, the data received by storage controller 124 is made available to an encoder (e.g., encoder 126), which encodes the data to produce one or more codewords. The one or more codewords are made available to storage medium I/O 128, which transfers the one or more codewords to one or more memory channels 150 for storage in one or more NVM devices 140, in a manner dependent on the type of storage medium being utilized.

In some embodiments, a read operation is initiated when computer system 110 sends one or more host read commands to storage controller 124 (e.g., specifically, to host interface 129 via data connections 101, or alternatively a separate control line or bus 111) requesting data from NVM devices 140. Storage controller 124 sends one or more read access commands to NVM device 140, via storage medium I/O 128, to obtain raw read data in accordance with memory locations (physical addresses), specified, directly or indirectly, by the one or more host read commands. Storage medium I/O 128 provides the raw read data (e.g., comprising one or more codewords) to a decoder (e.g., decoder 127). If the decoding is successful, the decoded data is provided to host interface 129, where the decoded data is made available to computer system 110. In some embodiments, if the decoding is not successful, storage controller 124 may resort to a number of remedial actions or provide an indication of an irresolvable error condition.

As explained above, NVM devices 140 are divided into a number of addressable and individually selectable blocks and each block is optionally (but typically) further divided into a plurality of pages and/or word lines and/or sectors. While erasure of non-volatile memory devices is performed on a block basis, in many embodiments, reading and programming of non-volatile memory devices is performed on a smaller subunit of a block (e.g., on a page basis, word line basis, or sector basis). In some embodiments, the smaller subunit of a block consists of multiple memory cells (e.g., single-level cells or multi-level cells). In some embodiments, programming is performed on an entire page. In some embodiments, a multi-level cell (MLC) NAND flash typically has four possible states per cell, yielding two bits of information per cell. Further, in some embodiments, a MLC NAND has two page types: (1) a lower page (sometimes called the fast page), and (2) an upper page (sometimes called the slow page). In some embodiments, a triple-level cell (TLC) NAND flash has eight possible states per cell, yielding three bits of information per cell. Although the description herein uses TLC, MLC, and SLC as examples, those skilled in the art will appreciate that the embodiments described herein may be extended to memory cells that have more than eight possible states per cell, yielding more than three bits of information per cell.

The encoding format of the storage media (i.e., TLC, MLC, or SLC and/or a chosen data redundancy mechanism) is a choice made when data is actually written to the storage media. Often in this specification there is described an event, condition, or process that is said to set the encoding format, alter the encoding format of the storage media, etc. It should be recognized that the actual process may involve multiple steps, e.g., erasure of the previous contents of the storage media followed by data being written using the new encoding format and that these operations may be separated in time from the initiating event, condition or procedure.

As an example, if data is written to non-volatile memory devices in pages, but the non-volatile memory devices are erased in blocks, pages in the non-volatile memory devices may contain invalid (e.g., stale) data, but those pages cannot be overwritten until the whole block containing those pages is erased. In order to write to the pages with invalid data, the pages (if any) with valid data in that block are read and re-written to a new block and the old block is erased (or put on a queue for erasing). This process is called garbage collection. After garbage collection, the new block contains the pages with valid data and may have free pages that are available for new data to be written, and the old block can be erased so as to be available for new data to be written.

Since flash memory can only be programmed and erased a limited number of times, the efficiency of the algorithm used to pick the next block(s) to re-write and erase has a significant impact on the lifetime and reliability of flash-based storage systems.

Figure 2:
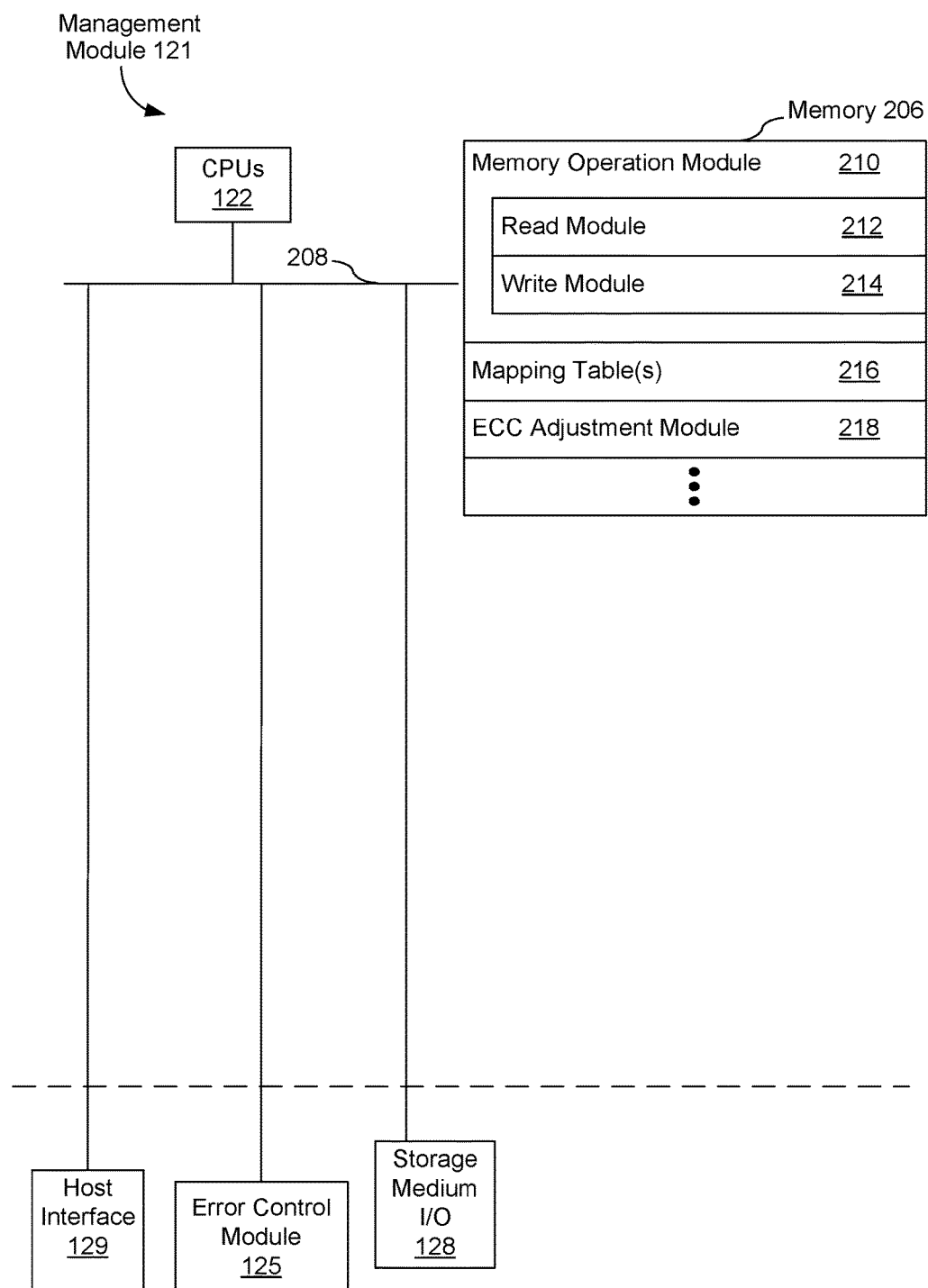
FIG. 2 is a block diagram illustrating an implementation of a management module, in accordance with some embodiments.

FIG. 2 is a block diagram illustrating an implementation of a management module 121, in accordance with some embodiments. Management module 121 typically includes one or more CPUs 122 (also sometimes called processors, hardware processors, processing units, microprocessors or microcontrollers) for executing modules, programs and/or instructions stored in memory 206 and thereby performing processing operations, memory 206, and one or more communication buses 208 for interconnecting these components. Communication buses 208 optionally include circuitry (sometimes called a chipset) that interconnects and controls communications between system components. Memory 206 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 206 optionally includes one or more storage devices remotely located from CPUs 122. Memory 206, or alternately the non-volatile memory device(s) within memory 206, comprises a non-transitory computer readable storage medium. In some embodiments, memory 206, or the computer readable storage medium of memory 206 stores the following programs, modules, and data structures, or a subset thereof:

a memory operation module 210 for dispatching commands corresponding to read, write and/or erase operations for reading data from, writing data to, or erasing data from NVM devices 140; in some implementations memory operation module 210 dispatches commands to NVM controllers 130, which in turn dispatch the commands to NVM devices 140; the memory operation module 210 including:

a read module 212 for performing read operations, including identifying (e.g., from mapping table 216, headers 408 (FIG. 4B), etc.) physical locations in the storage device corresponding to logical addresses (e.g., of logical groups of data), and reading data from the identified physical locations; and a write module 214 for performing write operations, including determining whether a remaining capacity of a physical memory portion (e.g., physical page 402-1, FIG. 4B) satisfies (e.g., is less than, or is greater than or equal to) a threshold capacity; storing data for one or more logical portions of respective logical groups of data (e.g., a head and/or tail logical portion) in one or more physical locations in the storage device, and storing information (e.g., in mapping table 216, headers 408 (FIG. 4B), etc.) specifying one or more physical locations corresponding to data for respective logical groups of data;

mapping table(s) 216 (sometimes referred to as "forward translation tables") for mapping logical addresses (e.g., of logical groups of data) to physical addresses (e.g., physical locations in physical memory portions); and an error correction code (ECC) adjustment module 218 for maintaining, defining, and modifying error correction formats (e.g., modifying code rate, codeword structure, and/or error correction type) for memory portions of non-volatile memory, wherein modifying an error correction format is optionally in accordance with a measured performance metric (e.g., a bit-error rate) for a respective memory portion.

Each of the above identified elements (e.g., modules 210, 212, 214, 218, and mapping table 216) may be stored in one or more of the previously mentioned memory devices (e.g., the devices that comprise memory 206 of management module 121), and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above. In some embodiments, the programs, modules, and data structures stored in memory 206, or the computer readable storage medium of memory 206, provide instructions for implementing respective operations in the methods described below with reference to FIGS. 5A-5E, and 6A-6D.

Although FIG. 2 shows management module 121, FIG. 2 is intended more as a functional description of the various features which may be present in a management module than as a structural schematic of the embodiments described herein. In practice, and as recognized by those of ordinary skill in the art, items shown separately could be combined and some items could be separated. Further, although FIG. 2 shows management module 121 of storage controller 124, in embodiments that include NVM controllers (e.g., NVM controllers 130-1 through 130-m) in storage device 120 (FIG. 1), some of the functions shown in FIG. 2 as being implemented in management module 121 may instead be implemented, in whole or in part, in management modules (not shown) of the NVM controllers.

Figure 3:
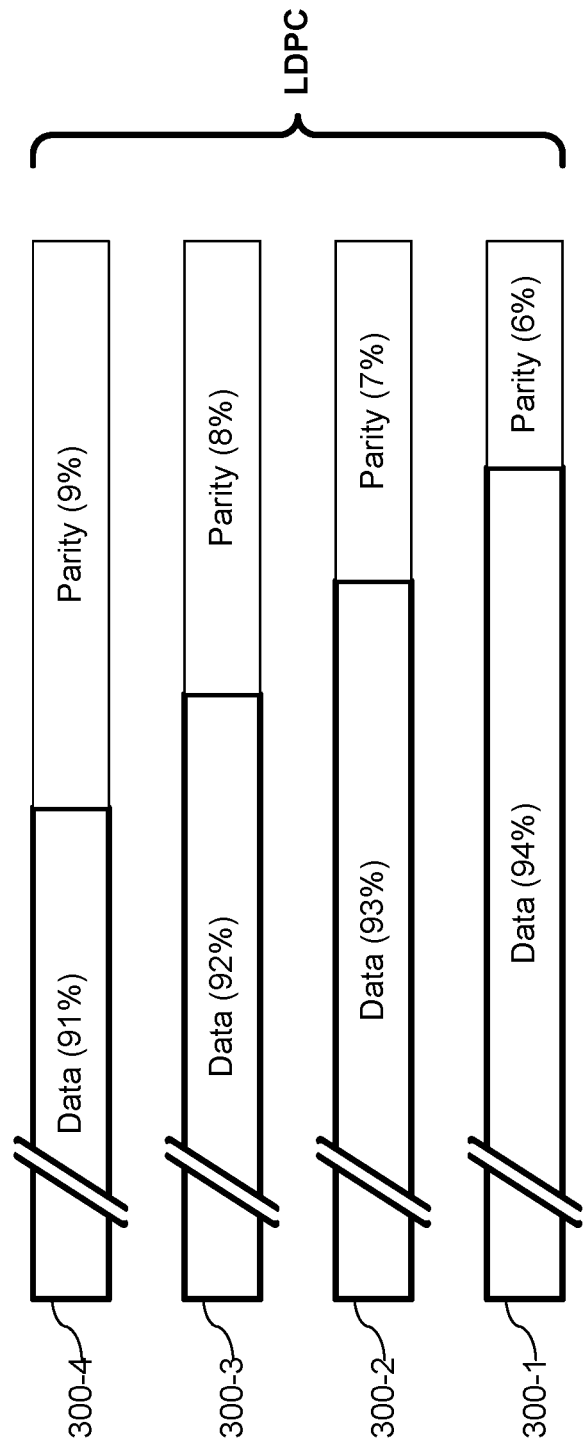
FIG. 3 illustrates codewords produced in accordance with various error correction formats, in accordance with some embodiments.

FIG. 3 illustrates codewords produced in accordance with various error correction formats, in accordance with some embodiments. As will be described below, an error correction format corresponds to a combination of an error correction type, code rate, and codeword structure for encoding and decoding data in a storage system. Furthermore, while codewords 300 illustrate a relative proportion of data to error correction bits (e.g., parity), it is understood that codewords 300 are not necessarily drawn to scale.

As described above with respect to FIG. 1, data storage system 120 can implement a variety of error correction schemes for encoding and decoding data. Systems are configured to encode and decode data in accordance with an error correction type (e.g., BCH, LDPC, etc.), which determines the types of encoders, decoders, and algorithms used for encoding and decoding data. In addition, in some embodiments, data storage system 120 is also configured to encode and decode data in accordance with a code rate and codeword structure (e.g., codeword length). The code rate is inversely related to the redundancy (e.g., parity) and error correction capability of a codeword. Specifically, code rate is typically defined as a ratio of data bits in a codeword (e.g., representing host/user data) to the size of the codeword, represented mathematically as r=K/N, where the code rate r is the ratio of the data bits K to the codeword length N. Alternatively, code rate is sometimes represented as the percentage (e.g., 94 percent) of codeword bits in a codeword that are data bits. As an example, an encoder that encodes data at a code rate of 0.94 produces codewords having 94 bits of data for every 6 error correction bits. An equivalent metric, the ECC rate (sometimes called the parity rate), is sometimes defined as the ratio of error correction bits in a codeword to the codeword length. Thus, a 6% ECC rate is equivalent to a 94% code rate. In a non-limiting example, a typical codeword size is between 1 KB and 16 KB, inclusive, such as 2 KB or 4 KB.

An error correction type (e.g., BCH), code rate (e.g., 6% parity), and codeword structure (e.g., codeword length) for encoding and decoding data define a respective error correction format. An error correction format, given its corresponding error correction type, code rate, and/or codeword structure, generally indicates a relative error correction capability (i.e., number of detectable and recoverable bits errors in a codeword) with respect to data encoded and decoded in accordance with the error correction format. For instance, referring to the examples of FIG. 3, the error correction format with which codeword 300-3 is produced (e.g., LDPC algorithm, code rate 0.92) provides a higher error correction capability than the error correction format with which codeword 300-1 (which has the same codeword length as codeword 300-3) is produced (e.g., LDPC algorithm, code rate 0.94).

Thus, varying degrees of error correction capability (and therefore error correction formats) can be achieved by modifying a code rate, codeword structure, and/or an error correction type. FIG. 3 illustrates codewords 300-1 through 300-4 produced in accordance with a variety of example error correction formats, shown in order of increasing error correction capability (from codeword 300-1 to 300-4). In some embodiments, the error correction formats used to produce codewords 300-1 to 300-4 are a predefined sequence of error correction formats. FIG. 3 also shows respective percentages of data bits and error correction bits of corresponding codewords, in addition to the corresponding error correction type (e.g., codeword 300-1 produced in accordance with a code rate of 0.94 and the LDPC algorithm).

In some cases, when transitioning from one error correction format to the next error correction format in a predefined sequence of error correction formats, only a single aspect of the error correction format is modified (e.g., modifying only the code rate, while keeping the codeword length the same). In other cases, when transitioning from one particular error correction format to the next in a predefined sequence of error correction formats, two or more aspects of the error correction format are modified. In some cases, when transitioning from one particular error correction format to the next in a predefined sequence of error correction formats, the codeword structure (e.g., codeword length) is modified while maintaining the same code rate. In other embodiments, the number of encoded data bits and the number of error correction bits are not adjusted proportionally, thereby resulting in a modified code rate (e.g., in reducing the codeword length while keeping the number of parity bits fixed, the number of data bits is reduced, and thus the code rate is reduced). In some implementations (not illustrated), when transitioning from one particular error correction format to the next in a predefined sequence of error correction formats, the error correction type is modified (e.g., from BCH to LDPC) while maintaining at least one of the other parameters of the error correction format (e.g., keeping the same code rate). In some cases or implementations, modifying the code rate includes reducing the number of error correction bits while keeping the number of data bits fixed for a respective codeword (sometimes referred to as "puncturing"). In yet other cases or implementations, modifying the code rate includes inserting bit values of zero (or alternatively, ones) into the portion of the codeword allocated for data while keeping the codeword length and the number of error correction bits fixed, such that the code rate effectively increases (sometimes referred to as "padding").

Codewords to be stored in a particular physical memory portion of a storage device are encoded and decoded in accordance with a respective error correction format for that particular memory portion (or for a group of memory portions that include the particular memory portion). A memory portion of a storage device comprises one or any combination of memory devices (e.g., NVM devices 140) of the storage device, or a portion of one or more memory devices (e.g., an individual erase block of NVM device 140-1, a plurality of erase blocks of NVM device 140-1, a portion of an erase block such as all pages of a word line in NVM device 140-1, etc.). Typically (although only in some embodiments), codewords stored in many, but not all, memory portions of a storage device are initially produced (by encoding data) and decoded in accordance with the same error correction format (e.g., a default set of encoding/decoding parameters). Referring to data storage system 100 of FIG. 1, for example, when storage device 120 is first placed in service, an initial default error correction format (e.g. BCH, with a code rate of 0.97 and a codeword size of 4 KB) is used to encode and decode data in all memory portions of storage device 120 other than those memory portions identified through testing as needing a different (e.g., stronger) error correction format.

However, in some embodiments, different respective error correction formats are used for encoding data in different respective memory portions of a storage device. Particularly, the performance of non-volatile memory devices (e.g., NVM devices 140-1 through 140-$n$) varies among the physical memory portions thereof (e.g., word lines, blocks, physical pages, etc.). An observed range of different measured bit error rates across non-volatile memory devices, for example, may be a consequence of natural variations in quality over non-volatile memory devices (e.g., dies, erase blocks, pages). Given the impact of such variations on the performance of non-volatile memory devices, in some situations, encoding and decoding data in accordance with the same error correction format for all non-volatile memory devices in a storage device does not optimize data redundancy (i.e., parity) and system efficiency (e.g., number of encode and decode operations for processing a given amount of user data). That is, to satisfy predefined performance thresholds (e.g., requiring that each NVM device 140 achieves a bit error rate within or below specified thresholds), some non-volatile memory devices or physical memory portions require less error correction capability and some require greater error correction capability. Thus, to optimize data redundancy and system efficiency, distinct error correction formats are used for respective memory portions of a storage device. As an example, referring to FIG. 1, data written to and retrieved from NVM device 140-1 is encoded and decoded in accordance with a first error correction format (e.g., BCH algorithm, code rate of 0.97, and codeword length of 4 KB), whereas data written to and retrieved from NVM device 140-2 is encoded and decoded in accordance with a second error correction format (e.g., LDPC algorithm, code rate of 0.94, and codeword length of 4 KB).

As a consequence of implementing multiple or modified error correction formats, groups of data are sometimes split and stored across multiple physical memory portions of one or multiple non-volatile memory devices. Accordingly, as described in greater detail below, various methods are employed for optimizing operations for reading and storing such data.

Figure 4A:
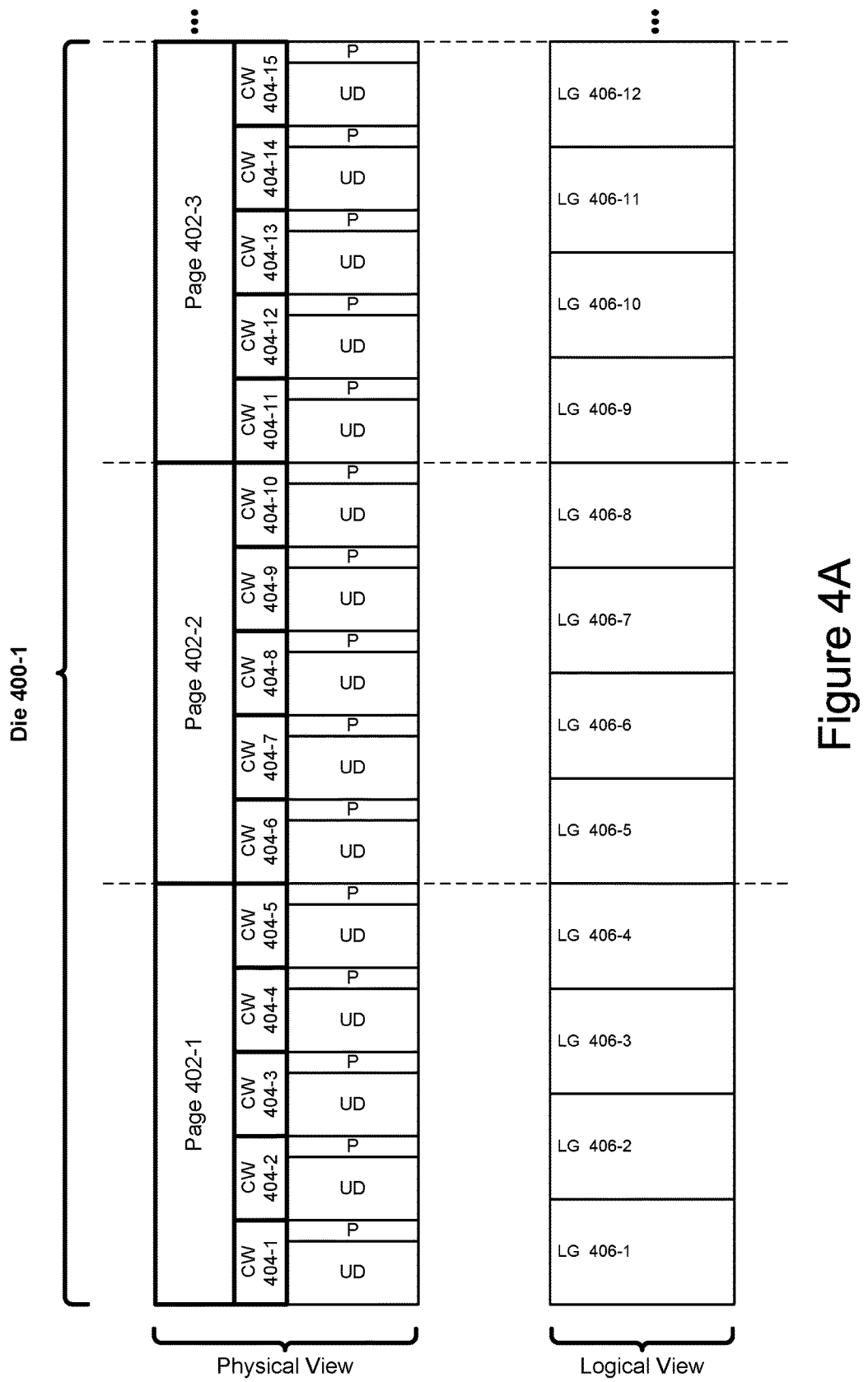
FIGS. 4A-4B represent physical and logical views of data in a storage device, in accordance with some embodiments.
Figure 4B:
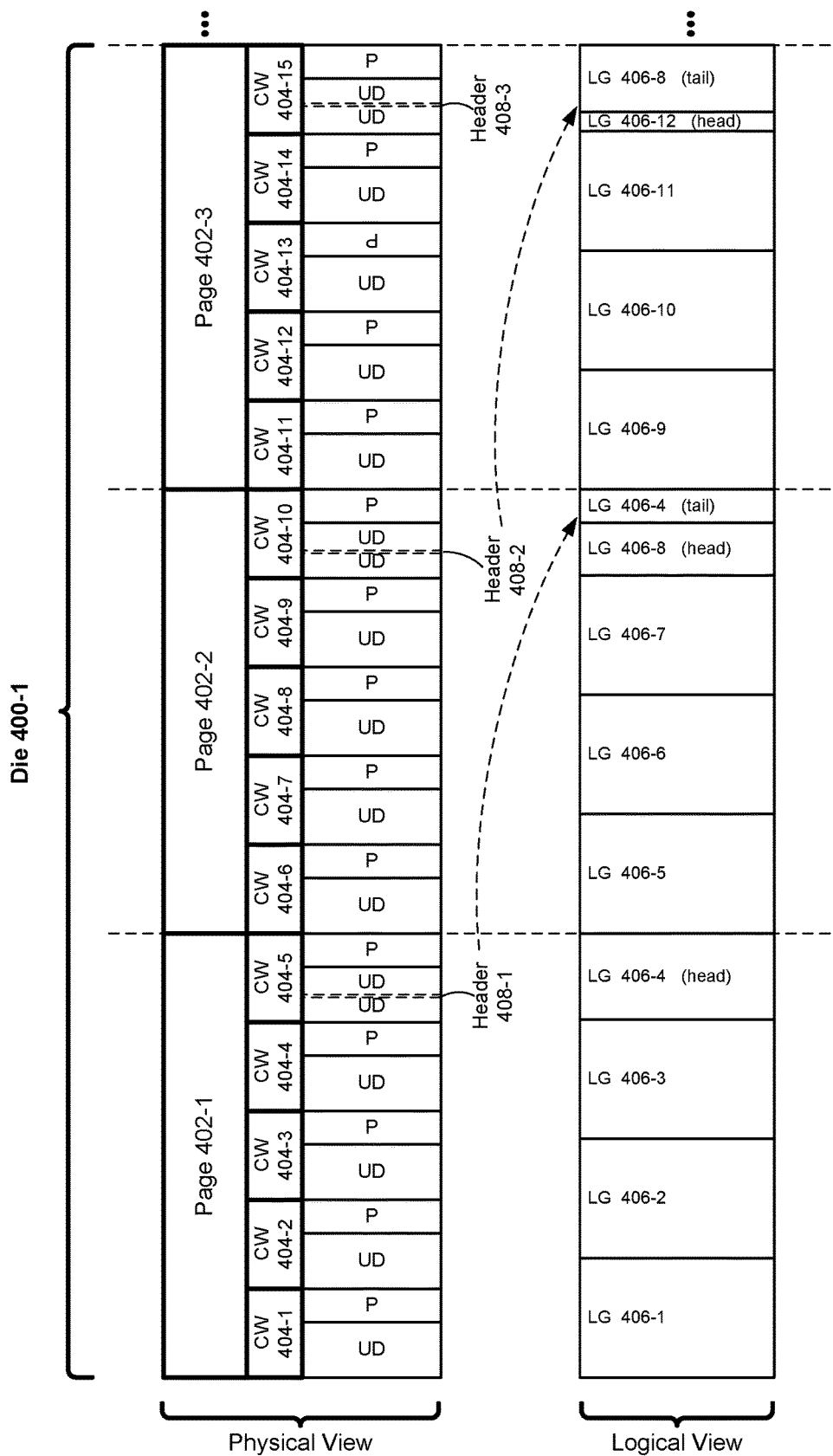

FIGS. 4A-4B represent physical and logical views of data in a storage device, in accordance with some embodiments.

As shown in FIGS. 4A-4B, logical groups of data (as shown in the "logical view") are stored as codewords, which are produced by encoding the logical groups of data (e.g., codewords 404-1 and 404-2 include user data (UD) comprising logical group 406-1, in addition to parity bits (P), FIG. 4A). The "physical view" portion illustrates the physical locations of the codewords (e.g., codewords 404-1 through 404-15) and the physical memory portions (e.g., physical pages 402-1 through 402-3) to which logical groups of data correspond. For example, as shown in FIG. 4A, codewords 404-1 and 404-2 for logical group 406-1 have physical locations corresponding to physical page 402-1 of die 400-1, which is one of a plurality of die comprising NVM device 140-1 in memory channel 150-1 of FIG. 1.

Logical groups (e.g., logical groups 406-1 through 406-12), sometimes referred to as "virtual pages," are groups of user data, representing predefined units of user data used by a host system for performing memory operations (e.g., writing data to or reading data from storage device 120, FIG. 1). Logical groups have logical addresses (e.g., logical addresses in a logical address space of computer system 110, FIG. 1). In some embodiments, all logical groups of data have the same amount of user data (i.e., data excluding ECC bits) per logical group. As a non-limiting example, a logical group of data has 4 KB or 8 KB of user data. As shown in the physical view, logical groups of data are encoded as one or more codewords, and are stored at physical locations of respective physical memory portions.

In some cases, logical groups of data are mapped to physical locations corresponding to a single physical memory portion (e.g., logical group 406-1 being mapped to codewords 404-1 and 404-2 in physical page 402-1, FIG. 4A). However, in other cases described below, logical groups of data are mapped to multiple physical locations corresponding to different physical memory portions (e.g., a head logical portion of logical group 406-4 being mapped to codeword 404-5 in physical page 402-1, and a tail logical portion of logical group 406-4 being mapped to codeword 404-10 in physical page 402-2, FIG. 4B).

Particularly, in some embodiments, a given logical group of data is encoded in accordance with encoding parameters (e.g., error correction formats specifying a code rate, a codeword structure, an error correction type, etc.) specific to the physical memory portions in which corresponding codewords are stored. Ideally, encoding parameters (e.g., a code rate and/or a codeword structure) and the size of logical groups in a host system (e.g., data storage system 100) would be configured such that the physical memory portions of a storage device include an integer number of codewords corresponding to an integer number of logical groups (e.g., a system configured such that each physical page of a non-volatile memory device stores five codewords corresponding to four logical groups of data). Integer correspondence between memory portions, codewords, and logical groups would allow systems to perform single read operations in retrieving any single logical group of data (e.g., by requiring that only one physical page be read), and permit systems to store less metadata for indicating the corresponding physical locations of a logical group of data (e.g., data need only specify a single physical memory portion in which data is stored). An example of such a system is shown in FIG. 4A.

However, as discussed throughout, some storage devices employ multiple or modified error correction formats when storing data in different memory portions of the data storage device. In these cases, integer correspondence between memory portions, codewords, and logical groups is not possible without sacrificing (e.g., by storing null data in) a significant portion of the storage device's available storage space. That is, in such implementations, at least some physical memory portions do not store codewords for an integer number of logical groups of data, resulting in codewords for at least some logical groups of data being split across distinct physical memory portions. An example of such a system is shown in FIG. 4B, where the system implements encoding parameters at least partially distinct from those implemented in FIG. 4A. In comparison to FIG. 4A, the lower code rate in FIG. 4B (i.e., lower ratio of user data to parity bits) results in codewords containing less user data. Thus, physical memory portions are able to store data for fewer logical groups of data, and in this case, a non-integer correspondence arises in the number of logical groups of data per physical memory portion. In the example shown in FIG. 4B, user data for logical group 406-4 is contained within codewords 404-5 and 404-10, respectively located in distinct physical pages 402-1 and 402-2. These distinct logical portions of a given logical group of data are sometimes referred to as a "head" logical portion (e.g., portion of logical group 406-4 corresponding to codeword 404-5) and a "tail" logical portion (e.g., portion of logical group 406-4 corresponding to codeword 404-10). Consequently, in such systems, information specifying the mapped physical locations and physical memory portions for logical groups of data is stored during (or more generally, in conjunction with) the execution of write operations, and can subsequently be used in executing read operations for quickly retrieving requested data.

The one or more physical locations (and corresponding memory portions) in a storage device to which logical groups of data are mapped and stored (e.g., as codewords) may be specified and identified in a variety of ways. In some embodiments, one or more mapping tables (e.g., mapping table 216 of memory 206, FIG. 2) include one or more entries specifying mapping information that indicates the physical locations in memory to which the logical groups of data are mapped (e.g., codeword identifier, codeword offset, offset based on units of memory, physical memory portion identifier, etc.). When a logical group of data is mapped to two physical locations having distinct physical memory portions, a corresponding entry of a mapping table in some cases specifies both physical locations (e.g., for logical group 406-8, an entry of a mapping table specifies codeword 404-10 in physical page 402-2, and specifies codeword 404-15 in physical page 402-3). In other implementations, however, the mapping table only specifies a single physical location (e.g., specifying codeword 404-10 in physical page 402-2), and information specifying the other physical location is stored separately from the mapping table (e.g., as data in a header segment). As an example, referring to FIG. 4B, user data for logical group 406-4 is encoded into codewords 404-5 and 404-10. Here, the physical location of codeword 404-5 (e.g., specified as an offset of four codewords in physical page 402-1) is stored in an entry of a mapping table (e.g., mapping table 216 of memory 206, FIG. 2), while the physical location of codeword 404-10 (e.g., specified as an offset of four codewords in physical page 402-2) is separately stored as data in header 408-1. In this example, the storage device first identifies the physical location of codeword 404-5 from the mapping table, and after reading (and decoding) codeword 404-5, identifies the physical location of and subsequently retrieves codeword 404-10.

Methods for executing read and write operations for logical groups of data in accordance with various encoding and decoding parameters are described in greater detail below with respect to FIGS. 5A-5E and 6A-6D. The various implementations described provide efficient and effective methods for storing and locating logical groups of data given any variety of possible error correction formats employed by a storage device.

FIGS. 5A-5E illustrate a flowchart representation of a method 500 of reading data stored in a non-volatile memory device, in accordance with some embodiments. Method 500 coordinates and manages multiple sub-system components of a storage device to execute read commands for retrieving data from a storage device. At least in some implementations, one or more steps of method 500 are performed by a storage device (e.g., storage device 120, FIG. 1) or one or more components of the storage device (e.g., storage controller 124, management module 121, error control module 125, and/or NVM controllers 130, FIG. 1). In some embodiments, method 500 is governed by instructions that are stored in a non-transitory computer readable storage medium and that are executed by one or more processors of a device, such as the one or more processors 122 of management module 121 (FIG. 2) in storage controller 124, and/or the one or more processors of NVM controllers 130 (not shown).

A non-volatile storage device (e.g., storage device 120, FIG. 1) has (502) a plurality of physical memory portions having a predefined sequence of physical locations in one or more non-volatile memory (NVM) devices of the storage device. An example is illustrated in FIG. 4A, where physical pages 402-1 through 402-3 are physical memory portions having sequential physical locations in die 400-1. In some embodiments, each of the plurality of physical memory portions comprises (504) a respective integer number of codewords arranged in a respective sequence (e.g., physical page 402-1 comprising codewords 404-1 through 404-5 arranged in a sequence, FIG. 4A).

The storage device (e.g., storage device 120, FIG. 1) executes (506) a plurality of read commands, each read command of the plurality of read commands for reading a requested logical group of data from a specified logical address, the requested logical group of data comprising one or more logical portions. As described with respect to FIG. 1, a host system (e.g., computer system 110) sends one or more host read commands to storage controller 124 requesting a logical group of data from the storage device (e.g., from NVM devices 140 of memory channels 150).

Executing the plurality of read commands includes, for each of the plurality of read commands, identifying (5508), from a mapping table, a first physical location in the storage device corresponding to the logical address specified by the read command. The mapping table (e.g., stored as mapping table 216 in memory 206, FIG. 2) includes one or more entries that specify one or more physical locations in physical memory portions of the storage device at which data for a requested logical group of data is stored (e.g., physical locations of codewords that contain user data for a requested logical group of data). In some implementations, physical locations are specified as offsets within a respective physical memory portion (e.g., offset based on number of codewords, units of memory, etc., measured from the beginning of a respective physical memory portion) at which data for the requested logical group of data is stored. In some implementations, physical locations specify a respective memory address or range of memory addresses within a respective physical memory portion. As described in greater detail below, entries of the mapping table sometimes include alternative and/or optional data for identifying physical locations for corresponding logical groups of data having multiple logical portions (e.g., flags, physical location of header segments, etc.).

In some circumstances, the first physical location corresponds to data for the entire requested logical group of data, and corresponds to a single physical memory portion of the plurality of physical memory portions (e.g., the first physical location corresponds to codewords 404-6 and 406-7 in physical page 402-2, which include all the user data for logical group 406-5, FIG. 4A). In some other circumstances, the first physical location corresponds (510) to data for a head logical portion of the one or more logical portions of the requested logical group of data, and thus corresponds to a first physical memory portion of the plurality of physical memory portions. For example, referring to FIG. 4B, the head logical portion of logical group 406-4 has a physical location corresponding to codeword 404-5 in physical page 402-1, while a tail logical portion of logical group 406-4 (described in greater detail below) has a physical location corresponding to a different codeword in a different physical page (e.g., codeword 404-10 in physical page 402-1).

In some embodiments, the first physical memory portion is (512) a first physical page of the storage device (e.g., physical page 402-1 of NVM 140-1, FIGS. 1 and 4A). In some embodiments, the first physical memory portion is (514) a physical memory portion of a first die (e.g., physical page 402-1, of die 400-1, FIG. 4A).

In some embodiments, the first physical location corresponds (516) to a subset of codewords, of respective codewords for the first physical memory portion, located at the end of the respective sequence (e.g., for logical group 406-4, the first physical location corresponds to the offset for codeword 404-5, FIG. 4A). In some implementations, the subset of codewords comprises one or a plurality of codewords, depending on the circumstance.

Executing the plurality of read commands includes, for each of the plurality of read commands, reading (518) data from the first physical location in the storage device corresponding to the logical address. In some implementations, data is read (520) from the first physical memory portion (to which the first physical location corresponds). As an example, after identifying the physical location of logical group 406-4 in FIG. 4A (e.g., codeword 404-5 in physical page 402-1 of die 400-1), storage medium I/O 128 (FIG. 1) retrieves all (or a subset of all) codewords stored in physical page 402-1, and provides the one or more codewords to decoder 127 for subsequent decoding.

Figure 5A:
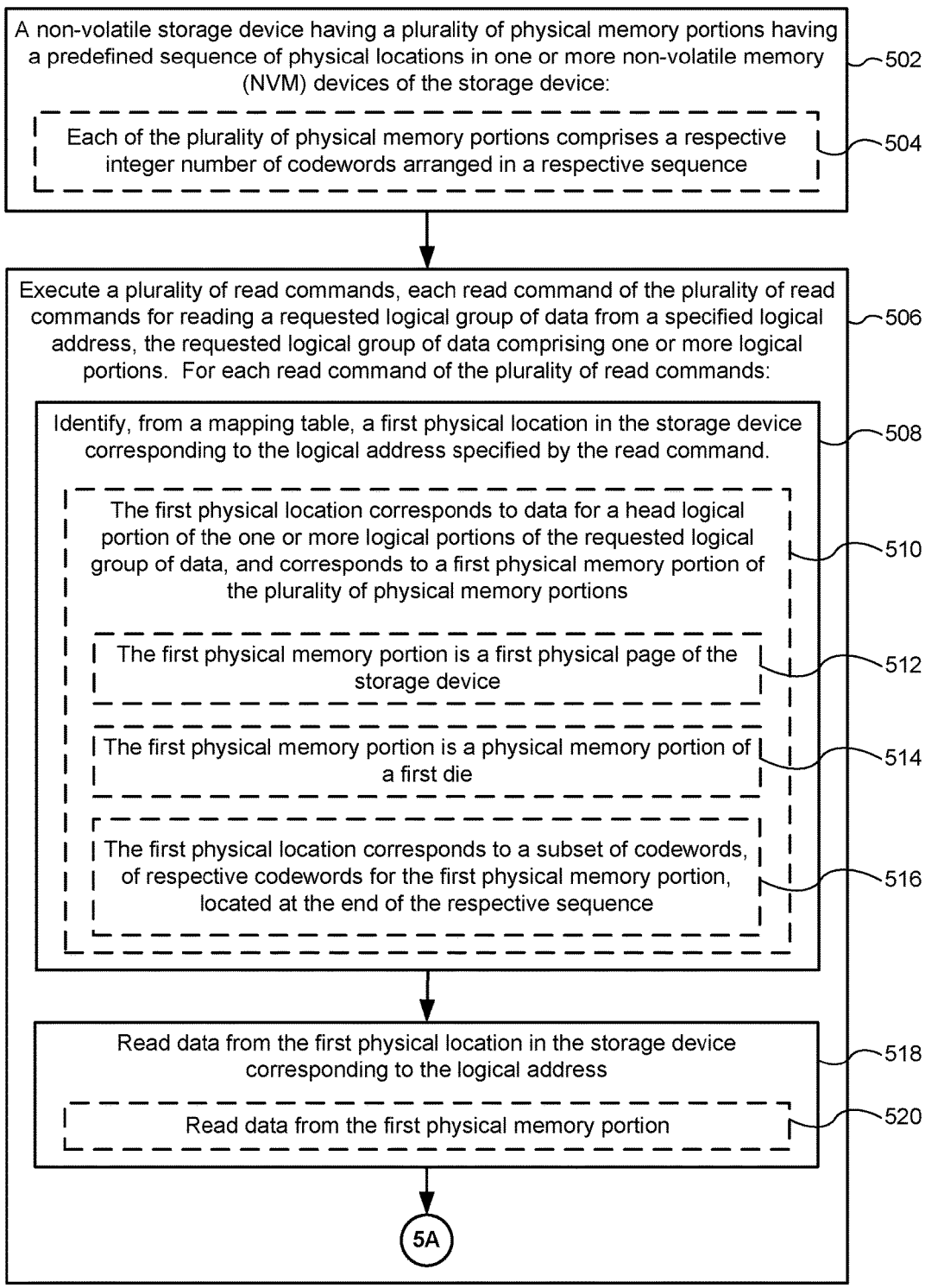
FIGS. 5A-5E illustrates a flowchart representation of a method for reading data stored in a non-volatile memory device, in accordance with some embodiments.
Figure 5B:
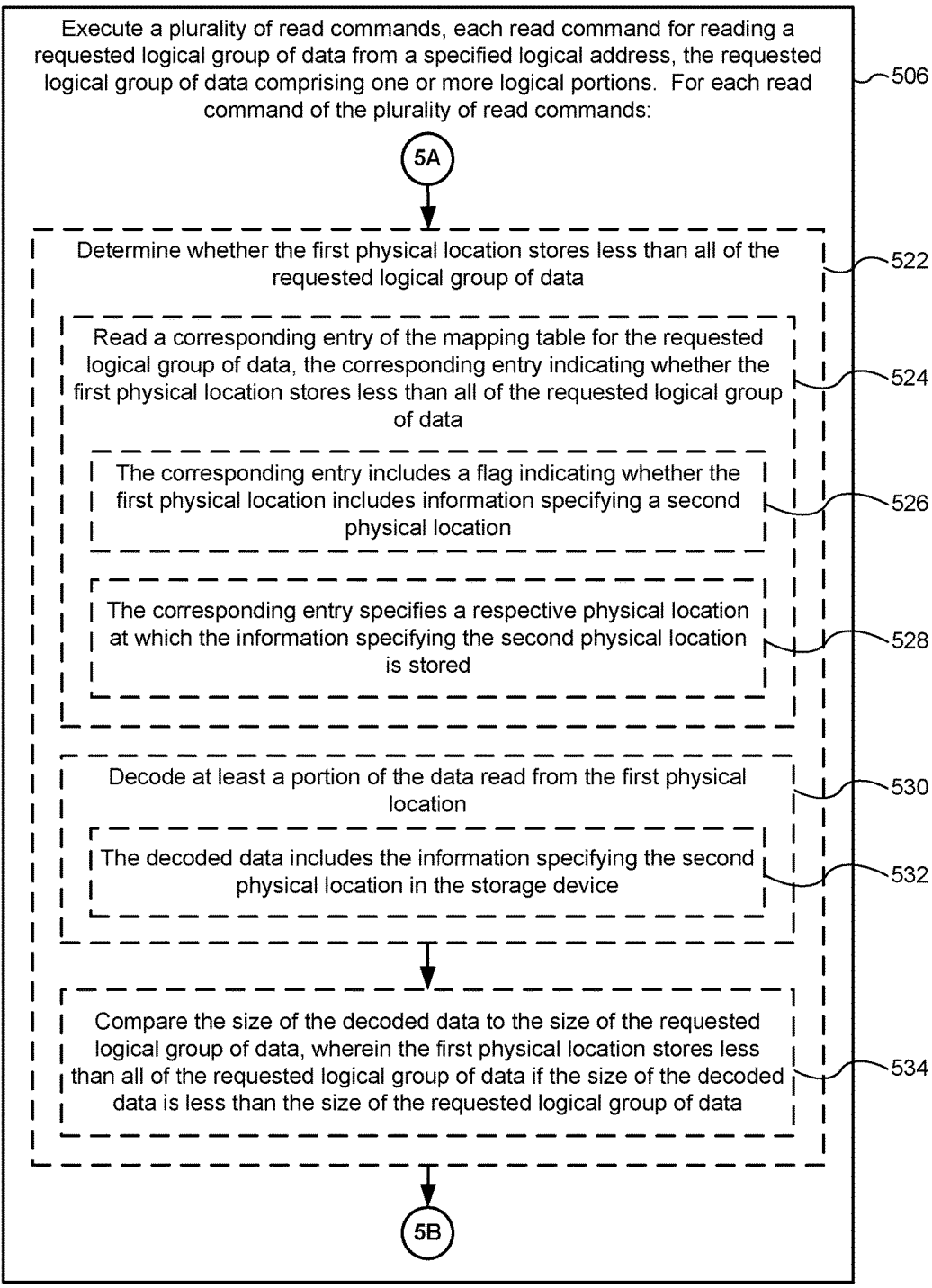

Referring now to FIG. 5B, in some embodiments, executing the plurality of read commands includes, for each of the plurality of read commands, determining (522) whether the first physical location stores less than all of the requested logical group of data. In other words, a determination is made whether the first identified physical location (step 508, FIG. 5A) corresponds to only a portion of the data for the requested logical group of data (i.e., data for only one of multiple logical portions), while the remaining data for the requested logical group of data is stored in a different physical location of a distinct physical memory portion.

In some embodiments, determining whether the first physical location stores less than all of the requested logical group of data includes reading (524) a corresponding entry of the mapping table (e.g., mapping table 216, FIG. 2) for the requested logical group of data, the corresponding entry indicating whether the first physical location stores less than all of the requested logical group of data. In some implementations, the corresponding entry in the mapping table includes a flag (e.g., a binary value in a designated field) indicating whether the first physical location (i.e., data stored in the first physical location) includes information specifying a second physical location. As a non-limiting example, referring to FIG. 4B, an entry in the mapping table 216 (FIG. 2) for logical group 406-4 includes data specifying the first physical location for the head logical portion of logical group 406-4 (e.g., an offset for codeword 404-5 in physical page 402-1), and further includes a value in a designated field indicating that the first physical location (i.e., data contained within codeword 404-5) includes information specifying a second physical location (e.g., flag indicates that codeword 404-5 includes a header segment, such as header 408-1). In some implementations, the corresponding entry of the mapping table specifies (528) a respective physical location at which the information specifying the second physical location is stored (e.g., an offset for a codeword in which a header segment is stored, the header segment including data specifying the second physical location). Header segments and information stored within such header segments are described in greater detail with respect to FIG. 5C.

Additionally and/or alternatively, determining that the first physical location stores less than all of the requested logical group of data includes reading the corresponding entry of the mapping table, which specifies the first and second physical locations corresponding to data for the one or more logical portions of the requested logical group of data. The first and second physical locations correspond to distinct physical memory portions of the plurality of physical memory portions of the storage device. For example, a mapping table entry for logical group 406-8 specifies physical page 402-1 and an offset within physical page 402-1 for codeword 404-5 (corresponding to the head logical portion), in addition to specifying physical page 402-2 and an offset within physical page 402-2 for codeword 404-10 (corresponding to the tail logical portion).

In some embodiments, determining that the first physical location stores less than all of the requested logical group of data includes decoding (530) at least a portion of the data read from the first physical location. In some implementations, the decoded data includes (532) the information specifying the second physical location in the storage device (e.g., header 408-1 is encoded as part of codeword 404-5, and determining that the requested logical group comprises multiple logical portions corresponding to different physical memory portions includes decoding at least a portion of codeword 404-5 that contains the encoded header 408-1).

Alternatively, in some implementations, data read from the first physical location includes one or more codewords corresponding to encoded data for a portion of requested logical group of data, and further includes data corresponding to the information specifying the second physical location (e.g., a header segment that is not encoded and that is stored separately from the codewords). In such implementations, the storage device determines that the first physical location stores less than all of the requested logical group of data by reading the data corresponding to the information specifying the second physical location (e.g., directly reading a header segment without decoding any codewords).

In some embodiments, determining that the first physical location stores less than all of the requested logical group of data includes comparing (534) the size of the decoded data to the size of the requested logical group of data, wherein the first physical location stores less than all of the requested logical group of data if the size of the decoded data is less than the size of the requested logical group of data (e.g., user data corresponding to logical group 406-8 that is obtained by decoding codeword 404-10 is less than the size of logical group 406-8, FIG. 4B). Conversely, the first physical location (and thus the corresponding physical memory portion) stores data for the entire requested logical group of data if the size of the decoded data (corresponding to the requested logical group of data) is equal to (or greater than, if the decoded data also includes user data for another logical group) the size of the requested logical group of data.

Figure 5C:
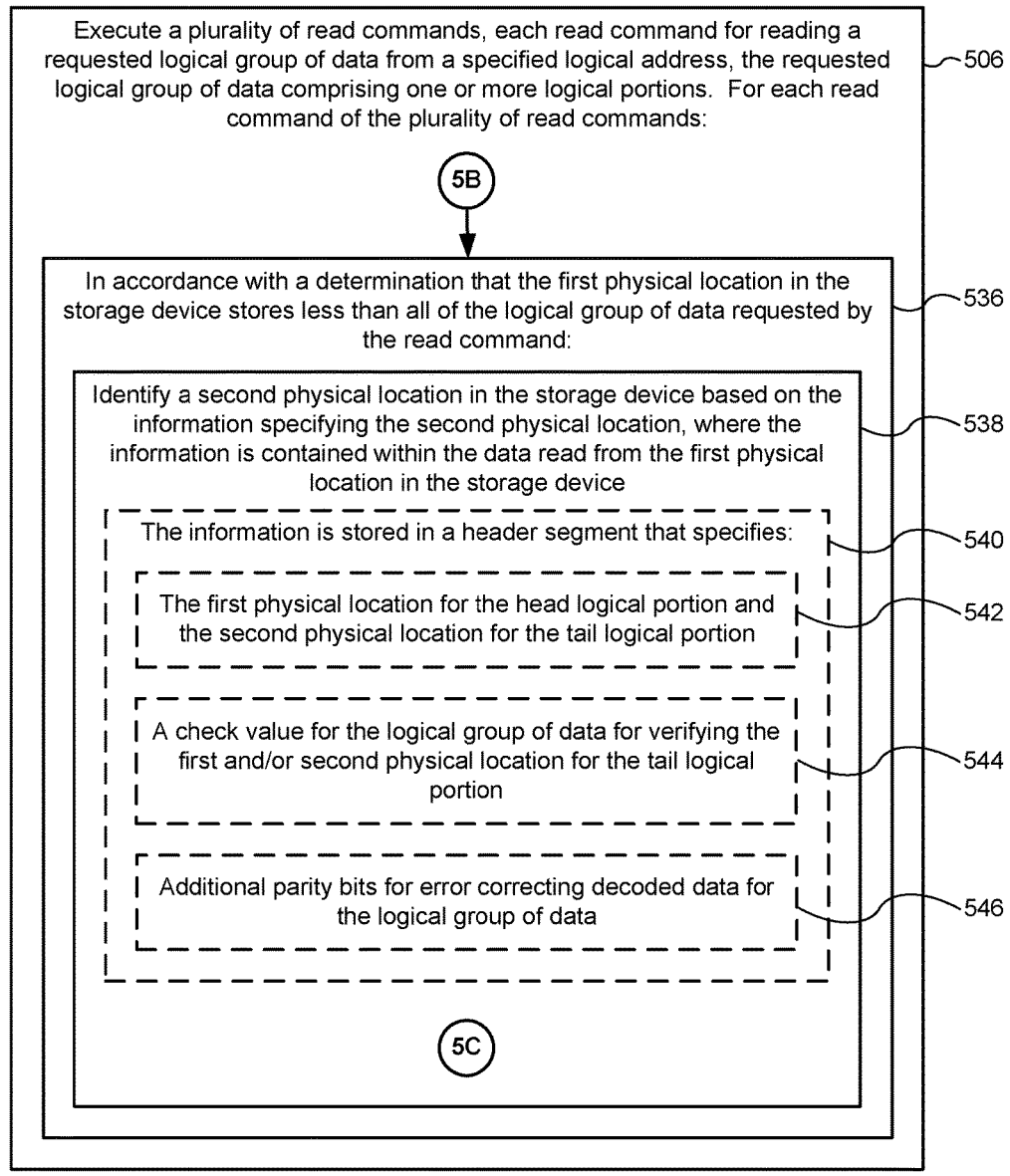

Referring now to FIG. 5C, in accordance with a determination that the first physical location in the storage device stores less than all of the logical group of data requested by the read command, executing the plurality of read commands includes, for each of the plurality of read commands, identifying (538) a second physical location in the storage device based on information specifying the second physical location. The information specifying the second physical location is contained within the data read from the first physical location in the storage device. Additionally and/or alternatively (as described previously), the information specifying the second physical location is specified in the corresponding entry of the mapping table (e.g., mapping table 216, FIG. 2).

In some embodiments, the information specifying the second physical location is stored (540) in a header segment (e.g., header 408-1, FIG. 4B) that specifies: the first physical location for the head logical portion and the second physical location for the tail logical portion (542) (e.g., respective offsets within respective memory portions); a check value (544) for the logical group of data for verifying the first and/or second physical location for the tail logical portion (e.g., a corresponding value is stored (e.g., in the mapping table) separately from and compared against the check value, where a match indicates that the first and/or second physical locations specified by the header segment are accurate); and/or additional parity bits (546) for error correcting decoded data for the logical group of data. Referring to FIG. 4B, header 408-1 is associated with logical group 406-4 and is stored (e.g., as encoded data) in codeword 404-5. In this example, header 408-1 includes information specifying the physical locations of both the head logical portion (e.g., offset of four codewords in physical page 402-1) and the tail logical portion for logical group 406-4 (e.g., offset of four codewords in physical page 402-2). In alternative implementations, the header segment specifies the second physical location for the tail logical portion, but does not specify the first physical location for the head logical portion (e.g., because the physical location of the head logical portion is implied by, or easily derived from, the physical location of the header segment). In some embodiments, the header segment specifies respective lengths (e.g., data size) for the head and/or tail logical portions.

Figure 5D:
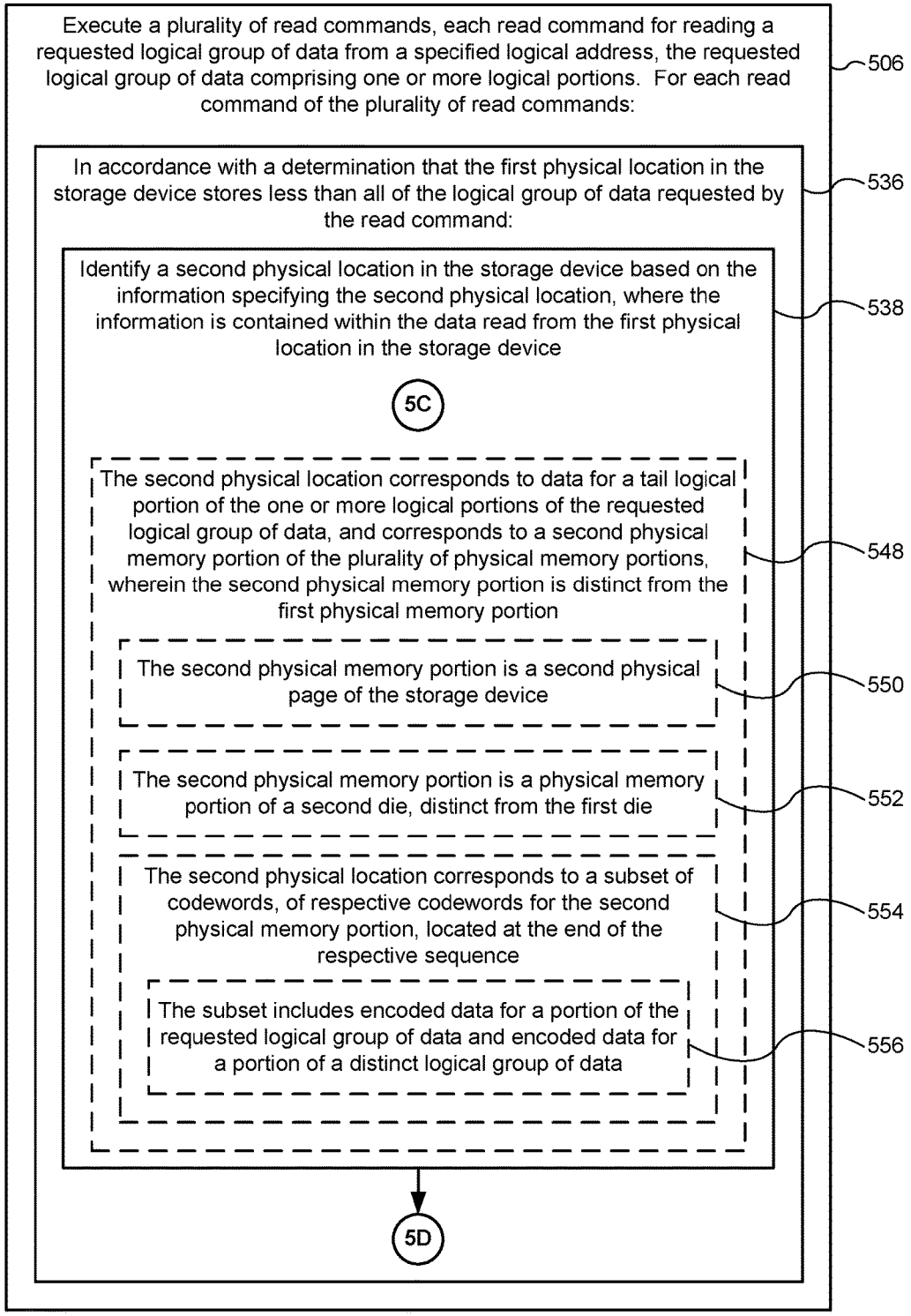

Referring now to FIG. 5D, in some embodiments, the second physical location corresponds (548) to data for a tail logical portion of the one or more logical portions of the requested logical group of data, and corresponds to a second physical memory portion of the plurality of physical memory portions, wherein the second physical memory portion is distinct from the first physical memory portion. An example is shown in FIG. 4B, where respective data for the head and tail logical portions of logical group 406-4 are stored at physical locations corresponding to distinct physical memory portions (physical pages 402-1 and 402-2, respectively).

In some embodiments, the second physical memory portion is (550) a second physical page of the storage device (e.g., physical page 402-2, which is distinct from a first physical memory portion, such as physical page 402-1, FIG. 4B). In some embodiments, the first physical memory portion and the second physical memory portion are physical memory portions of the same die (e.g., physical pages 402-1 and 402-2 of die 400-1 in FIG. 4B). In some embodiments, the second physical memory portion is (552) a physical memory portion of a second die, distinct from the first die (e.g., a physical page of a die distinct from die 400-1 in FIG. 4B, not shown).

In some embodiments, the second physical location corresponds (554) to a subset of codewords, of respective codewords for the second physical memory portion, located at the end of the respective sequence (e.g., for logical group 406-8, the second physical location corresponds to an offset for codeword 404-15, FIG. 4B). In some implementations, the subset of codewords corresponding to the first physical location (516, FIG. 5A) and the subset of codewords corresponding to the second physical location each comprise a single codeword (e.g., for logical group 406-8, the first physical location corresponds to codeword 404-10, and the second physical location corresponds to codeword 404-15). In some implementations, the subset of codewords includes (556) encoded data for a portion of the requested logical group of data and encoded data for a portion of a distinct logical group of data (e.g., codeword 404-15 includes encoded data for both logical group 406-12 and logical group 406-8). In some embodiments, the encoded data for the portion of the distinct logical group of data corresponds to a head logical portion for the distinct logical group of data (e.g., based on the example above, codeword 404-15 includes encoded data for a head logical portion of logical group 406-12).

Figure 5E:
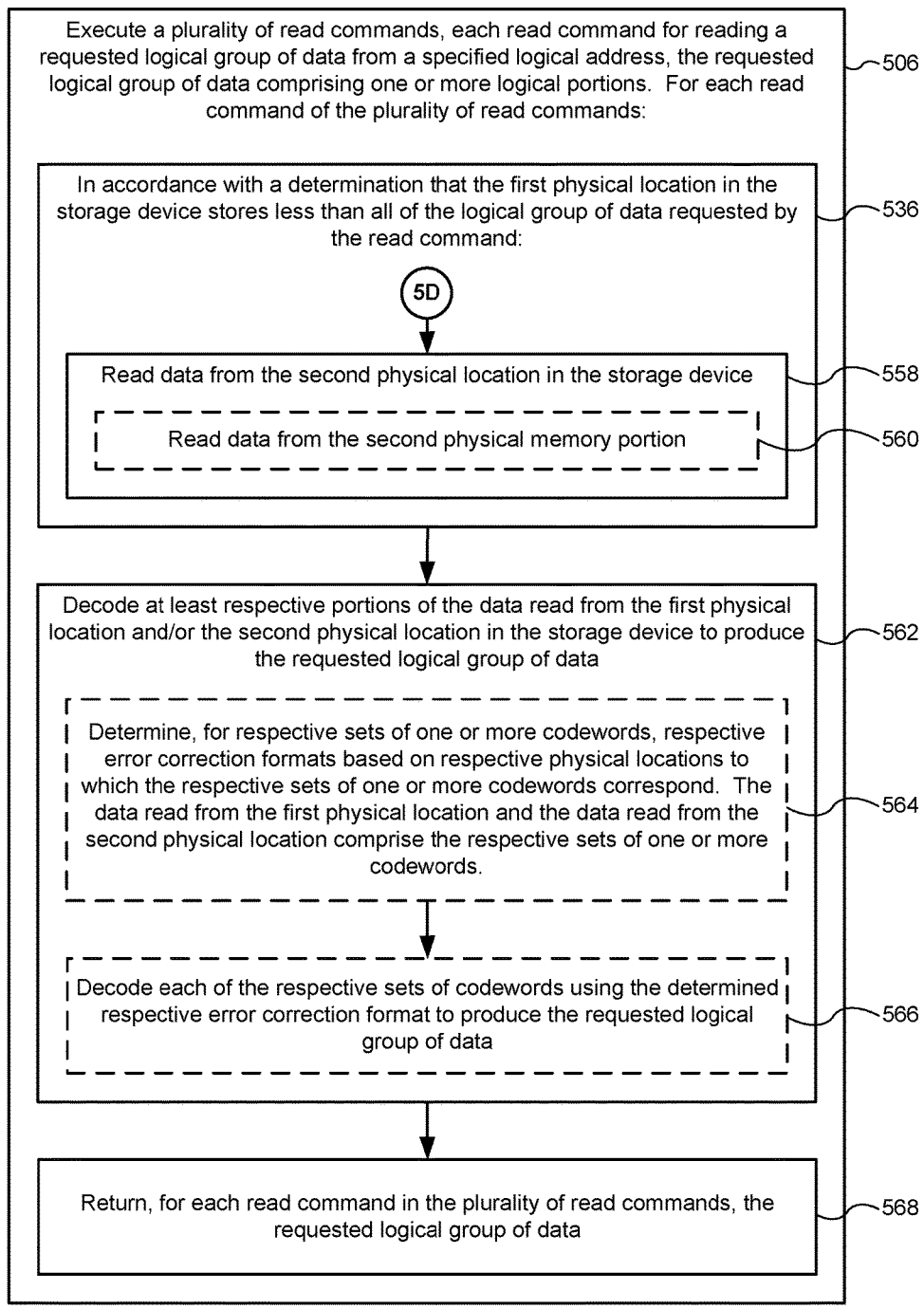

Referring now to FIG. 5E, data is read (558) from the second physical location in the storage device (identified in 538, FIG. 5C). In some implementations, data is read (560) from the second physical memory portion (to which the second physical location corresponds). As an example, after identifying the second physical location of the tail logical portion of logical group 406-4 in FIG. 4B (e.g., codeword 404-10 in physical page 402-2 of die 400-1), storage medium I/O 128 (FIG. 1) retrieves a subset (or all) of the codewords stored in physical page 402-2, and provides the subset of codewords to decoder 127 for decoding.

After data is read from the first physical location (e.g., logical group of data being a single logical portion), or from the first and second physical locations (e.g., logical group of data comprising a first and second logical portion), executing the plurality of read commands includes, for each of the plurality of read commands, decoding (562) (e.g., by decoder 127, FIG. 1) at least respective portions of the data read from the first physical location and/or the second physical location in the storage device to produce the requested logical group of data.

In some embodiments, the decoding (562) includes determining (564), for respective sets of one or more codewords, respective error correction formats based on respective physical locations (and physical memory portion) to which the respective sets of one or more codewords correspond, where the data read from the first physical location and the data read from the second physical location comprise the respective sets of one or more codewords. As previously described, the error correction format indicates at least one of a corresponding code rate, a codeword structure, and an error correction type for a respective physical memory portion to which a respective physical location corresponds. Each of the respective sets of codewords are decoded (566)

using the determined respective error correction format to produce the requested logical group of data. In some embodiments, the respective error correction formats are stored in (and thus obtained from) the mapping table (e.g., in a corresponding entry of mapping table 216 in memory 206, FIG. 2).

In some embodiments, the respective error correction formats are stored in one or more tables or data structures separate from the mapping table. For example, in some embodiments, a first table stores information specifying or indicating the current default error correction format for each non-volatile memory device (e.g., flash memory die), for example in a separate entry for each non-volatile memory device, and a second table stores information specifying or indicating exceptions to those default error correction format (e.g., each entry in the second table indicates a particular physical memory portion, such as a block or block sub-region, and the current error correction format used or to be used when storing data in and reading data from that physical memory portion. In some embodiments, the second table is a sparsely populated table, optionally implemented using a tree structure or hash table, and indexed by physical address. In some embodiments, a separate second table is provided for each non-volatile memory device, or for each group of non-volatile memory device (e.g., all the non-volatile memory devices in a memory channel or all the non-volatile memory devices in a non-volatile memory module).

In some implementations, an error correction format for a respective set of codewords corresponding to the first physical location (e.g., a head logical portion) and an error correction format for a respective set of codewords corresponding to the second physical location (e.g., a tail logical portion) are the same. As an example (referring to FIG. 4B), physical pages 402-1 and 402-2 store data encoded with the same error correction format such that their respective codewords (e.g., codewords 404-1 through 404-5 for physical page 402-1, and codewords 404-6 through 404-10 for physical page 402-2) have the same code rate, as illustrated by equivalent proportions of user data UD and parity P per codeword. Thus, the same code rate is used in decoding codewords 404-5 and 404-10 for logical group 406-4. In other embodiments, an error correction format for a respective set of codewords corresponding to the first physical location (e.g., a head logical portion) and an error correction format for a respective set of codewords corresponding to the second physical location (e.g., a tail logical portion) are distinct. In another example (referring to FIG. 4B), physical pages 402-2 and 402-3 store data encoded with distinct error correction formats, such that codewords 404-6 through 404-10 of physical page 402-2 are encoded with the LDPC error correction algorithm and a code rate of 94 percent, while codewords 404-11 through 404-15 of physical page 402-3 are encoded with the LDPC error correction algorithm and a code rate of 93 percent.

In yet another example (referring to FIG. 4B), physical pages 402-2 and 402-3 store data encoded with distinct error correction formats, such that codewords 404-6 through 404-10 of physical page 402-2 are encoded with the BCH error correction algorithm, while codewords 404-11 through 404-15 of physical page 402-3 are encoded with the LDPC error correction algorithm. Thus, in decoding data for logical group 406-8, the BCH error correction algorithm is used for decoding codeword 404-10, while the LDPC error correction algorithm is used for decoding codeword 404-15.

Furthermore, executing the plurality of read commands includes, for each of the plurality of read commands, returning (568) the requested logical group of data. For example, referring to FIG. 1, decoded data corresponding to a requested logical group is made available to computer system 110 by error control module 125 through host interface 129.

FIGS. 6A-6D illustrate a flowchart representation of a method 600 for storing data in a non-volatile memory device, in accordance with some embodiments. Method 600 coordinates and manages multiple sub-system components of a storage device to execute write commands for storing data in a storage device. At least in some implementations, one or more steps of method 600 are performed by a storage device (e.g., storage device 120, FIG. 1) or one or more components of the storage device (e.g., storage controller 124, management module 121, error control module 125, and/or NVM controllers 130, FIG. 1). In some embodiments, method 600 is governed by instructions that are stored in a non-transitory computer readable storage medium and that are executed by one or more processors of a device, such as the one or more processors 122 of management module 121 (FIG. 2) in storage controller 124, and/or the one or more processors of NVM controllers 130 (not shown).

A non-volatile storage device (e.g., storage device 120, FIG. 1) has (602) a plurality of physical memory portions having a predefined sequence of physical locations in one or more non-volatile memory (NVM) devices of the storage device (e.g., physical pages 402-1 and 402-2 are physical memory portions having sequential physical locations in die 400-1, FIG. 4A).

The storage device (e.g., storage device 120, FIG. 1) executes (604) a plurality of commands, each command of the plurality of commands for storing in a storage device a logical group of data comprising one or more logical portions, the logical group of data having a logical address. As described with respect to FIG. 1, a host system (e.g., computer system 110) sends to the storage device 120 a logical group of data and one or more host write commands for storing the logical group of data in the storage device 120.

In some embodiments, in accordance with a determination that the remaining capacity of a first physical memory portion is greater than or equal to the threshold capacity (606), executing the plurality of commands includes, for each of the plurality of commands, storing (608) all of the data for the one or more logical portions in the first physical memory portion. In such embodiments, the one or more logical portions comprise a single logical portion for the entire logical group of data. Stated another way, if the remaining capacity for a given physical memory portion (e.g., a current physical page to be written to base on a sequence of physical pages) is large enough to store all the data for a given logical group of data (e.g., based on the size of codewords to be generated for the logical group, which include encoded user data and parity), data for the given logical group is entirely stored (as codewords) in the given physical memory portion. In some implementations, the threshold capacity is an amount of data (e.g., in bytes) that a logical group of data occupies when written to the storage device (e.g., total size of codewords generated when encoding the logical group of data).

An example is illustrated in FIG. 4A. Here, the capacity of physical page 402-1 is five codewords (represented by codewords 404-1 through 404-5), which corresponds to the amount of data occupied by four logical groups of data (in this particular example, the amount of data occupied by a single logical group is represented by a non-integer number of codewords, specifically 1¼ codewords per logical group). After executing a write command for storing logical group 406-1, the remaining capacity of physical page 402-1 is at least three codewords (e.g., codewords 404-3 through 404-5). Given that the remaining capacity (3 codewords) is greater than the threshold capacity (1¼ codewords), the entirety of logical group 406-2 is stored in physical page 402-1.

In accordance with a determination that a remaining capacity of the first physical memory portion of the plurality of physical memory portions is less than the threshold capacity (610), executing a respective command of the plurality of commands includes storing (612) data for a head logical portion of the one or more logical portions in a first physical location in the storage device, the first physical location corresponding to the first physical memory portion. Furthermore (continuing with FIG. 6B), data for a tail logical portion of the one or more logical portions is stored (614) in a second physical location in the storage device, the second physical location corresponding to a second physical memory portion of the plurality of physical memory portions. In other words, if the remaining capacity for a current physical memory portion (in which data is being stored) is not large enough to store all the data for a given logical group of data (e.g., based on the total size of codewords to be generated for the logical group), data for the given logical group is split into multiple logical portions and stored across multiple physical memory portions. In some implementations, the first and second physical memory portions are (616) distinct (e.g., different physical pages of a single die).

An example is shown in FIG. 4B. In contrast to the example in FIG. 4A, here, a modified error correction format is implemented (in order to optimize performance for the storage device, for example, as discussed above), where the code rate has been reduced such that the ratio of user data to parity (e.g., parity bits) has decreased. As a result, more codewords (or if the same number of codewords, a greater portion thereof) are needed to encode data for a given logical group. Stated another way, a given codeword includes less user data for a given logical group. Furthermore, in comparison to FIG. 4A, physical memory portions such as physical pages 402-1 through 402-3 no longer have integer alignment with logical groups of data. In this example, the capacity of physical page 402-1 is five codewords, represented by codewords 404-1 through 404-5. As approximately illustrated, the amount of memory (i.e., non-volatile storage) occupied by a single logical group (i.e., the threshold capacity) is represented by a non-integer number of codewords, specifically 1⅓ codewords per logical group. Here, after executing write commands for storing logical groups 406-1 through 406-3, the remaining capacity of physical page 402-1 is approximately a single codeword (e.g., codeword 404-5). Given that the remaining capacity (1 codeword) is less than the threshold capacity (1⅓ codewords), it is determined that the entirety of logical group 406-4 cannot be stored in physical page 402-1. As a result, data for logical group 406-4 is stored as two separate portions on two different physical memory portions: a head logical portion that is stored in physical page 402-1 (corresponding to codeword 404-5), and a tail logical portion that is stored in physical page 402-2 (corresponding to a portion of codeword 404-10).

In some embodiments, the second physical location at which the data for the tail logical portion is stored corresponds (618) to a determined offset from the beginning of the second physical memory portion (e.g., an offset based on a number of codewords, a number of units of memory, or the like). In some implementations, the determined offset to which the second physical location corresponds is a predefined offset (e.g., predefined number of codewords).

In some embodiments, the determined offset to which the second physical location corresponds is determined (620) based on a size of the data for the tail logical portion. The size of the data for the tail logical portion is predefined in some implementations (e.g., sizes for the head and/or tail logical portions of a logical group are predefined). Alternatively, the size of the data for the tail logical portion is determined (622) based on a total size of data for a maximum number of complete logical groups of data that can be stored within the first physical memory portion (e.g., the total size of codewords that include user data for the maximum number of complete logical groups). As an example, referring to FIG. 4B, the maximum number of complete logical groups of data that can be stored within physical page 402-1 is three (e.g., logical groups 406-1 through 406-3). The total size of data therefore corresponds to the total size of codewords 404-1 through 404-4 (i.e., the codewords that include user data for logical groups 406-1 through 406-3). The difference obtained by subtracting the total size of codewords 404-1 through 404-4 from the capacity of physical page 402-1 represents an amount of encoded data (from which an amount of user data can be calculated, based on the respective error correction format implemented for the physical memory portion, as discussed below) that can be stored in physical page 402-1 for the head logical portion of logical group 406-4. Accordingly, the size of the data for the tail logical portion is determined by subtracting the size of data for the head logical portion from the size of the logical group 406-4. Furthermore, the offset to which the second physical location corresponds is determined by subtracting a size of encoded data for the tail logical portion from the size of the second physical memory portion.

In some implementations, the total size of the data for the maximum number of complete logical groups of data is based on the error correction format, and the corresponding code rate, for the first physical memory portion. For example, for a fixed logical group size and a first code rate for a physical memory portion, an error correction format having a lower code rate than the first code rate results in generated codewords containing less user data, and thus the number of codewords per logical group increases. In contrast, an error correction format having a higher code rate than the first code rate results in generated codewords containing more user data, and thus the number of codewords per logical group decreases. In both cases, the total size of data for (and sometimes the number of) complete codewords that can be stored in the physical memory portion will vary, and consequently the determined size of the data for the head and tail logical portions also varies.

In some alternative embodiments, the second physical location corresponds to the beginning of the second physical memory portion (e.g., the head and tail logical portions are stored at adjacent physical locations corresponding to distinct physical memory portions). In other words, data for the head logical portion is encoded as the last codeword of a first physical page, and data for the tail logical portion is encoded as the first codeword of a distinct second physical page that follows the first physical page in a sequential arrangement of physical pages.

It is noted that the data capacity of a physical memory portion is the amount of data, excluding parity and other metadata, that can be stored in the physical memory portion. The t data capacity of the physical memory portion is less than the full storage capacity of the physical memory portion, because some of the storage capacity is occupied by codeword parity bits and, in some cases, header information.

In some embodiments, a size of a subsequent head logical portion of a subsequent logical group of data is based on a remaining data capacity of the second physical memory portion. The remaining data capacity is determined based on a total size of data for a maximum number of complete logical groups that can be stored within the second physical memory portion and the size of the data for the tail logical portion. Referring again to the example in FIG. 4B, logical group 406-8 is stored subsequently to logical group 406-4. Here, the size of the head logical portion of logical group 406-8 is determined by subtracting, from the total data capacity of physical page 402-2, (a) the size of the tail logical portion of logical group 406-4 (determined at step 620 above) and (b) the total size of the data for the complete logical groups included in codewords 404-6 through 404-9. In turn, the size of a tail logical portion of logical group 406-8, and a corresponding offset within physical page 402-3, is also determined using the determined size of the head logical portion for logical group 406-8.

In some embodiments, prior to storing data for the tail logical portion, data for the tail logical portion is buffered until a maximum number of complete logical groups is stored in the second physical memory portion. In doing so, codewords are stored in the second physical memory in a sequential fashion.

Figure 6A:
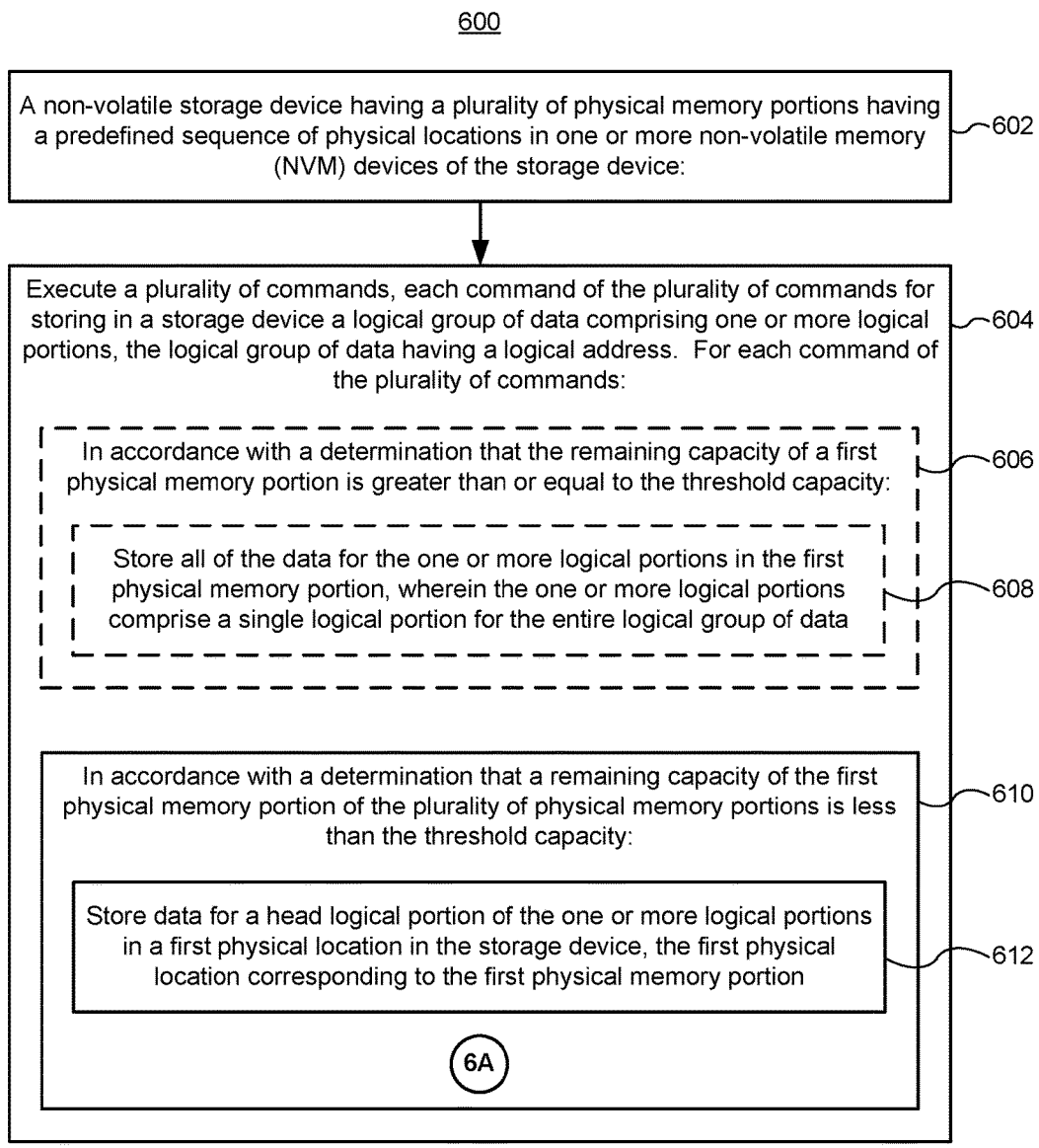
Figure 6C:
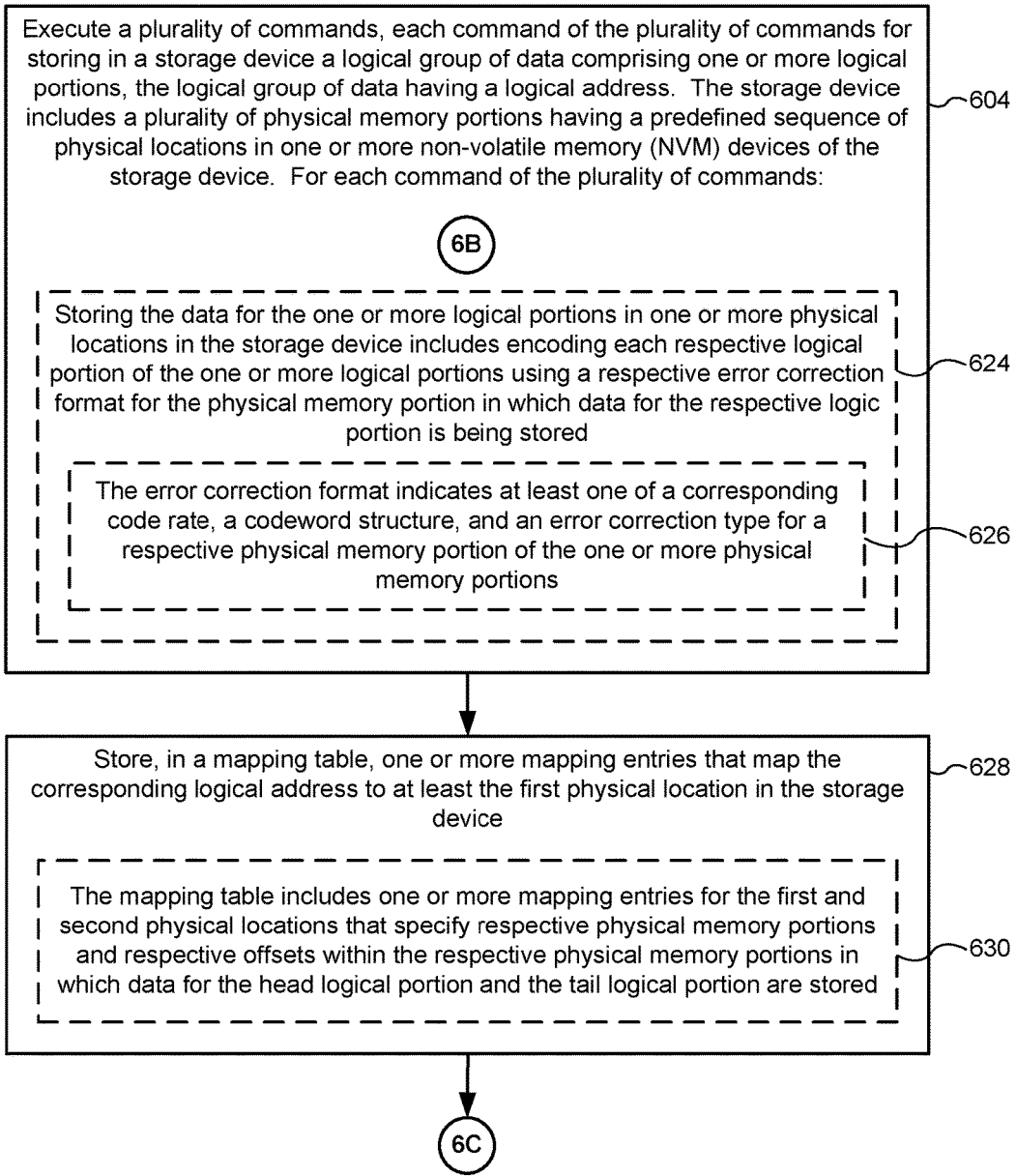

Referring now to FIG. 6C, in some embodiments, storing the data for the one or more logical portions in one or more physical locations in the storage device includes encoding (624) each respective logical portion of the one or more logical portions using a respective error correction format for the physical memory portion in which data for the respective logic portion is being stored. In some implementations, the error correction format indicates (626) at least one of a corresponding code rate, a codeword structure, and an error correction type for a respective physical memory portion of the one or more physical memory portions. As an example, referring to FIG. 4A, a corresponding error correction format (e.g., code rate, error correction algorithm, etc.) for physical page 402-2 will be used when encoding data for logical group 406-6 into codewords. Error correction formats are discussed in greater detail with respect to FIG. 3.

Furthermore, the storage device stores (628), in a mapping table (e.g., mapping table 216, FIG. 2), one or more mapping entries that map the corresponding logical address to at least the first physical location in the storage device. In some embodiments, the mapping table includes (630) one or more mapping entries for the first and second physical locations that specify respective physical memory portions and respective offsets within the respective physical memory portions in which data for the head logical portion and the tail logical portion are stored (e.g., for logical group 406-4, an offset of four codewords in physical page 402-1 for the head logical portion, and an offset of four codewords in physical page 402-2 for the tail logical portion). Mapping tables and the information they specify are described in greater detail with respect to FIGS. 5A-5B.

Figure 6D:

Referring now to FIG. 6D, the storage device optionally stores (632), separate from the mapping table, information specifying the second physical location corresponding to the data for the tail logical portion. In some embodiments, the information specifying the second physical location corresponding to the data for the tail logical portion is stored (634) in a header segment (e.g., header 408-1, FIG. 4B) that specifies the first physical location for the head logical portion and the second physical location for the tail logical portion (636). In some embodiments, the information specifying the second physical location corresponding to the data for the tail logical portion is stored (634) in a header segment (e.g., header 408-1, FIG. 4B) that specifies a check value (638) for the logical group of data for verifying the first and/or second physical location for the tail logical portion. Furthermore, in some embodiments, the information specifying the second physical location corresponding to the data for the tail logical portion is stored (634) in a header segment (e.g., header 408-1, FIG. 4B) that specifies additional parity bits (640) for error correcting decoded data for the logical group of data. Various implementations of header segments and the information they specify are described in greater detail with respect to FIG. 5C.

In some embodiments, the information specifying the second physical location is stored (642) at an adjacent physical location in the first physical memory portion next to the first physical location at which data for the head logical portion is stored. An example is illustrated (not to scale) in FIG. 4B. Referring to the physical view, header 408-2 for logical group 406-8 is stored in physical page 402-2 at a physical location adjacent to the user data for the head logical portion of logical group 406-8. In some implementations, the adjacent physical location is (644) also next to a different physical location at which data for a previous tail logical portion is stored, the previous tail logical portion corresponding to a logical portion for a different logical group of data. Referring again to the same example in FIG. 4B, the physical location at which header 408-2 is stored is also adjacent to the user data for the tail logical portion of logical group 406-4.

In some embodiments, at least the information specifying the second physical location is encoded (646) together with the data for the head logical portion into a set of one or more codewords (e.g., codeword 404-5 containing encoded data for header 408-1 and encoded user data for the head logical portion of logical group 406-4, FIG. 4B).

In some embodiments, the information specifying the second physical location is associated (648) with the head logical portion and the corresponding tail logical portion (e.g., header 408-2 is associated with the head and tail logical portions of logical group 406-8).

In some embodiments, an indication of a physical location at which the information specifying the second physical location is stored in the mapping table (e.g., an offset for a codeword in which a header segment is stored, the header segment including data specifying the second physical location).

It should be understood that the particular order in which the operations in FIGS. 5A-5E and 6A-6D have been described is merely exemplary and is not intended to indicate that the described order is the only order in which the operations could be performed. One of ordinary skill in the art would recognize various ways to reorder the operations described herein.

In some implementations, with respect to any of the methods described above, the non-volatile memory is a single non-volatile memory device (e.g., flash memory device), while in other implementations, the non-volatile memory includes a plurality of non-volatile memory devices (e.g., flash memory devices).

In some implementations, with respect to any of the methods described above, a storage device includes (1) one or more NVM devices, (2) a memory controller that includes a management module, and (3) an interface to receive a plurality of commands, the storage device configured to perform or control performance of any of the methods described above.

It will be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the claims to the precise forms disclosed. Many modifications and variations are possible in view of the above teachings. The implementations were chosen and described in order to best explain principles of operation and practical applications, to thereby enable others skilled in the art.

What is claimed is:

1. A method for storing data in a non-volatile storage device having a plurality of physical memory portions having a predefined sequence of physical locations in one or more non-volatile memory (NVM) devices of the storage device, the method comprising:
   executing a plurality of commands, each command of the plurality of commands for storing in the storage device a logical group of data comprising one or more logical portions, the logical group of data having a logical address, the executing including, for each command of the plurality of commands:
      in accordance with a determination that a remaining capacity of a first physical memory portion of the plurality of physical memory portions is less than a threshold capacity:
         storing data for a head logical portion of the one or more logical portions in a first physical location in the storage device, the first physical location corresponding to the first physical memory portion; and
         storing data for a tail logical portion of the one or more logical portions in a second physical location in the storage device, the second physical location corresponding to a second physical memory portion of the plurality of physical memory portions; and
      storing, in a mapping table, one or more mapping entries that map the corresponding logical address to at least the first physical location in the storage device.

2. The method of claim 1, wherein the mapping table includes one or more mapping entries for the first and second physical locations that specify respective physical memory portions and respective offsets within the respective physical memory portions in which data for the head logical portion and the tail logical portion are stored.

3. The method of claim 1, wherein the first and second physical memory portions are distinct physical pages of the storage device, or are distinct first and second physical memory portions in distinct first and second non-volatile memory die of the storage device.

4. The method of claim 1, further comprising:
   in accordance with a determination that the remaining capacity of the first physical memory portion is greater than or equal to the threshold capacity:
      storing all of the data for the one or more logical portions in the first physical memory portion, wherein the one or more logical portions comprise a single logical portion for the entire logical group of data.

5. The method of claim 1, wherein the second physical location at which the data for the tail logical portion is stored corresponds to a determined offset from the beginning of the second physical memory portion.

6. The method of claim 5, wherein the determined offset is determined based on a size of the data for the tail logical portion.

7. The method of claim 6, wherein the size of the data for the tail logical portion is determined based on a total size of data for a maximum number of complete logical groups of data that can be stored within the first physical memory portion.

8. The method of claim 7, wherein the total size of the data for the maximum number of complete logical groups of data is based on a corresponding error correction format for the first physical memory portion.

9. The method of claim 1, further comprising buffering data for the tail logical portion until a maximum number of complete logical groups is stored in the second physical memory portion.

10. The method of claim 1, wherein a size of a subsequent head logical portion of a subsequent logical group of data is based on a remaining data capacity of the second physical memory portion, the remaining data capacity determined based on a total size of data for a maximum number of complete logical groups that can be stored within the second physical memory portion and a size of the data for the tail logical portion.

11. The method of claim 1, further comprising:
   storing, separate from the mapping table, information specifying the second physical location corresponding to the data for the tail logical portion.

12. The method of claim 11, wherein the information specifying the second physical location is stored in a header segment that specifies:
the first physical location for the head logical portion and the second physical location for the tail logical portion;
a check value for the logical group of data for verifying the first and/or second physical location for the tail logical portion; and/or
additional parity bits for error correcting decoded data for the logical group of data.

13. The method of claim 11, wherein the information specifying the second physical location is stored at an adjacent physical location in the first physical memory portion next to the first physical location at which data for the head logical portion is stored.

14. The method of claim 13, wherein the adjacent physical location is also next to a different physical location at which data for a previous tail logical portion is stored, the previous tail logical portion corresponding to a logical portion for a different logical group of data.

15. The method of claim 11, wherein storing the information specifying the second physical location includes encoding at least the information specifying the second physical location together with the data for the head logical portion into a set of one or more codewords.

16. The method of claim 11, wherein the information specifying the second physical location is associated with the head logical portion and the corresponding tail logical portion.

17. The method of claim 11, further comprising storing, in the mapping table, an indication of a physical location at which the information specifying the second physical location is stored.

18. A storage device, comprising:
one or more NVM devices, wherein a plurality of physical memory portions of the storage device has a predefined sequence of physical locations in the one or more NVM devices;
a memory controller that includes a management module;
an interface to receive a plurality of commands, each command of the plurality of commands for storing in the storage device a logical group of data comprising one or more logical portions, the logical group of data having a logical address;
wherein the management module is configured to:
determine whether a remaining capacity of a first physical memory portion of the plurality of physical memory portions is less than a threshold capacity;
in accordance with a determination that the remaining capacity is less than the threshold capacity:
store data for a head logical portion of the one or more logical portions in a first physical location in the storage device, the first physical location corresponding to the first physical memory portion; and
store data for a tail logical portion of the one or more logical portions in a second physical location in the storage device, the second physical location corresponding to a second physical memory portion of the plurality of physical memory portions; and
store, in a mapping table, one or more mapping entries that map the corresponding logical address to at least the first physical location in the storage device.

19. A non-transitory computer readable storage medium, storing one or more programs for execution by one or more processors of a non-volatile storage device, the storage device comprising a plurality of physical memory portions having a predefined sequence of physical locations in one or more NVM devices of the storage device, and the one or more programs including instructions for performing operations comprising:
executing a plurality of commands, each command of the plurality of commands for storing in the storage device a logical group of data comprising one or more logical portions, the logical group of data having a logical address, the executing including, for each command of the plurality of commands:
in accordance with a determination that a remaining capacity of a first physical memory portion of the plurality of physical memory portions is less than a threshold capacity:
storing data for a head logical portion of the one or more logical portions in a first physical location in the storage device, the first physical location corresponding to the first physical memory portion; and
storing data for a tail logical portion of the one or more logical portions in a second physical location in the storage device, the second physical location corresponding to a second physical memory portion of the plurality of physical memory portions; and
storing, in a mapping table, one or more mapping entries that map the corresponding logical address to at least the first physical location in the storage device.

* * * * *